United States Patent
Oishi et al.

(10) Patent No.: US 12,061,825 B2
(45) Date of Patent: Aug. 13, 2024

(54) INFORMATION PROCESSING APPARATUS

(71) Applicant: CANON KABUSHIKI KAISHA, Tokyo (JP)

(72) Inventors: Saeko Oishi, Kanagawa (JP); Taichi Takemura, Chiba (JP); Akihito Yokote, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/890,848

(22) Filed: Aug. 18, 2022

(65) Prior Publication Data

US 2023/0064610 A1    Mar. 2, 2023

(30) Foreign Application Priority Data

Aug. 25, 2021 (JP) .................. 2021-136939

(51) Int. Cl.
*G06F 3/12* (2006.01)

(52) U.S. Cl.
CPC .......... *G06F 3/1208* (2013.01); *G06F 3/1217* (2013.01); *G06F 3/1234* (2013.01); *G06F 3/1273* (2013.01)

(58) Field of Classification Search
CPC .... G06F 3/1208; G06F 3/1217; G06F 3/1234; G06F 3/1273; G06F 3/1229; G06F 3/1285; H04N 1/6036; H04N 1/6091
See application file for complete search history.

(56) References Cited

U.S. PATENT DOCUMENTS

| | | | |
|---|---|---|---|
| 6,418,281 B1 | 7/2002 | Ohki | 399/49 |
| 2011/0222086 A1* | 9/2011 | Yamashita | H04N 1/6033 358/1.9 |
| 2016/0077458 A1* | 3/2016 | Shirafuji | G03G 15/5041 399/49 |
| 2017/0038716 A1* | 2/2017 | Itagaki | G03G 15/55 |
| 2017/0146922 A1* | 5/2017 | Wada | G03G 15/043 |
| 2017/0220912 A1* | 8/2017 | Toshihiro | G06K 15/181 |
| 2018/0183946 A1* | 6/2018 | Yamamoto | H04N 1/00087 |
| 2021/0081730 A1* | 3/2021 | Iwasawa | G03G 15/0848 |

FOREIGN PATENT DOCUMENTS

JP    2017-037100    2/2017

* cited by examiner

*Primary Examiner* — John R Wallace
(74) *Attorney, Agent, or Firm* — Venable LLP

(57) ABSTRACT

An information processing apparatus configured to output information to a computing apparatus configured to generate a model for determining a density of an image to be formed by an image forming apparatus, the information processing apparatus includes: an acquisition unit configured to acquire pieces of log data each relating to a measurement result of an image formed by the image forming apparatus; a reception unit configured to receive information for specifying a piece of log data to be used for generation of the model among the pieces of log data acquired by the acquisition unit; and a transmission unit configured to transmit the information to the computing apparatus.

4 Claims, 20 Drawing Sheets

| NUMBER | DATA ACQUISITION DATE AND TIME | PRINT CONDITION (TEMPERATURE /HUMIDITY) | DATA CORRESPONDENCE OF SIGNAL VALUE STORAGE UNIT | DATA CORRESPONDENCE OF IMAGE DENSITY STORAGE UNIT |
|---|---|---|---|---|
| 1 | 2020/10/10/08:52:39 | 22°C/61% | A | 1 |
| 2 | 2020/10/11/10:20:55 | 21°C/60% | B | – |
| 3 | 2020/10/16/13:43:19 | 26°C/70% | C | 2 |
| 4 | 2020/10/19/16:34:41 | 22°C/58% | D | – |
| 5 | 2020/10/21/20:21:07 | 20°C/50% | E | 3 |
| 6 | 2020/11/01/09:12:42 | 18°C/42% | F | – |
| 7 | 2020/11/11/11:08:10 | 15°C/40% | G | 4 |
| 8 | 2020/11/16/16:33:24 | 16°C/42% | H | – |
| 9 | 2020/11/22/19:15:57 | 14°C/32% | I | 5 |

FIG. 4

| | DATE & TIME | TEMPERATURE /HUMIDITY INFORMATION | PAPER TYPE | NUMBER OF ERRORS | NON-USE |
|---|---|---|---|---|---|
| 1 | 2020/11/22 19:15:57 | 14°C/32% | NORMAL PAPER 1 | 0 | ☐ |
| 2 | 2020/11/11 11:08:10 | 15°C/40% | THIN PAPER 2 | 1 | ☐ |
| 3 | 2020/10/21 20:21:07 | 20°C/50% | NORMAL PAPER 1 | 0 | ☐ |
| 4 | 2020/10/16 13:43:19 | 26°C/70% | NORMAL PAPER 1 | 0 | ✓ |
| 5 | 2020/10/10 08:52:39 | 22°C/61% | THICK PAPER 3 | 0 | ☐ |

LEARNING DATA SELECTION

ENTER

FIG. 25

INFORMATION PROCESSING APPARATUS

BACKGROUND OF THE INVENTION

Field of the Invention

The present disclosure relates to an information processing apparatus for controlling operation of an image forming apparatus, such as a copying machine, a multifunction peripheral, or a printer.

Description of the Related Art

Image density or tone characteristics of output images of an image forming apparatus changes due to a short-term change in state and a long-term change in state. The short-term change in state is caused by, for example, a change in installation environment or a change in environment inside the apparatus. The long-term change in state is caused by, for example, a temporal change in components or a developer. The changes in image density or tone characteristics cause degradation in image quality such as a color tint of output images. In order to suppress the changes in image quality or tone characteristics of output images to obtain desired image density or tone characteristics, the image forming apparatus corrects image forming conditions as required. Such correction of image forming conditions for suppressing changes in image density or tone characteristics is called "calibration." In the calibration, for example, a detection image having a uniform image density is formed, and image forming conditions are suitably corrected based on a result of comparison between a target value of the image density and an image density of the detection image.

In U.S. Pat. No. 6,418,281 B1, there is disclosed an image processing apparatus which stabilizes an image quality by forming a detection image for tone correction on a sheet and providing feedback regarding a result of reading the detection image with an image reading unit to image forming conditions such as γ correction. The timing at which the calibration is required is at the time of a change in environment or after leaving the image forming apparatus for a long period of time. In particular, it is required to perform the calibration at the timing at which the change in environment is liable to occur, such as at the time of turning on the power in early morning, at the time of returning from a power saving mode, in the case in which an image density of an output image is high so that a toner replenish amount is large, or in the case in which output images having a low image density are continuously output.

In recent years, there has been an increasing demand for stability of an image quality as well as improvement in usability. In particular, there has been an increasing demand for improvement in productivity through reduction in standby time or down time. Along with such demands, it is also required that the calibration for stabilizing the image quality be performed in a shorter period of time. In Japanese Patent Application Laid-open No. 2017-37100, there is disclosed an image forming apparatus which performs the calibration in a short period of time. This image forming apparatus creates a model with changes in external environment, image output conditions, and detection results of various sensors as input values. The image forming apparatus predicts changes in results of reading the detection image for calibration based on this model. The image forming apparatus utilizes such prediction to omit an image creation process for the detection image, which takes up much of a required time for calibration, thereby being capable of performing the calibration in a short period of time.

However, the calibration method of predicting the changes in color tint or image density of output images based on a model causes the following problems.

In a case of performing calibration control for image density adjustment with use of an optimum image density prediction model individually taking a use environment, an output condition, and a use situation into account, it is required to correct an image density prediction model which is currently given. This is because, typically, in an initial stage, such an average model that can cover a use environment or situation to some extent is generally used, and the model is not necessarily optimum for individual use environments. For correction of the image density prediction model, data that reflects, for example, a change in actual image density and an environment, an output condition, or the like is required.

However, there is a possibility that data that is inappropriate for use as correction data for the image density prediction model is also acquired disadvantageously. In this case, the image density is controlled with use of the model generated based on such correction data, with the result that a difference between a predicted image density and an actual image density may be degraded as compared to the difference given before correction of the model.

SUMMARY OF THE INVENTION

An information processing apparatus according to the present disclosure is configured to output information to a computing apparatus configured to generate a model for determining a density of an image to be formed by an image forming apparatus, the information processing apparatus includes: an acquisition unit configured to acquire pieces of log data each relating to a measurement result of an image formed by the image forming apparatus; a reception unit configured to receive information for specifying a piece of log data to be used for generation of the model among the pieces of log data acquired by the acquisition unit; and a transmission unit configured to transmit the information to the computing apparatus.

Further features of the present invention will become apparent from the following description of exemplary embodiments (with reference to the attached drawings).

BRIEF DESCRIPTION OF THE DRAWINGS

FIG. 4 is an explanatory table for showing information stored in a condition storage unit.

FIG. 25 is an exemplary view for illustrating a case in which a plurality of pieces of print condition information are displayed.

DESCRIPTION OF THE EMBODIMENTS

In the following, at least one embodiment of the present invention is described in detail with reference to the accompanying drawings. It should be noted that limitations that are technically preferred for embodying the present disclosure are placed on the at least one embodiment to be described below, but are not intended to limit the scope of the present disclosure to the following at least one embodiment and illustrated examples.

<Image Density Prediction Control System>

Figure 1:
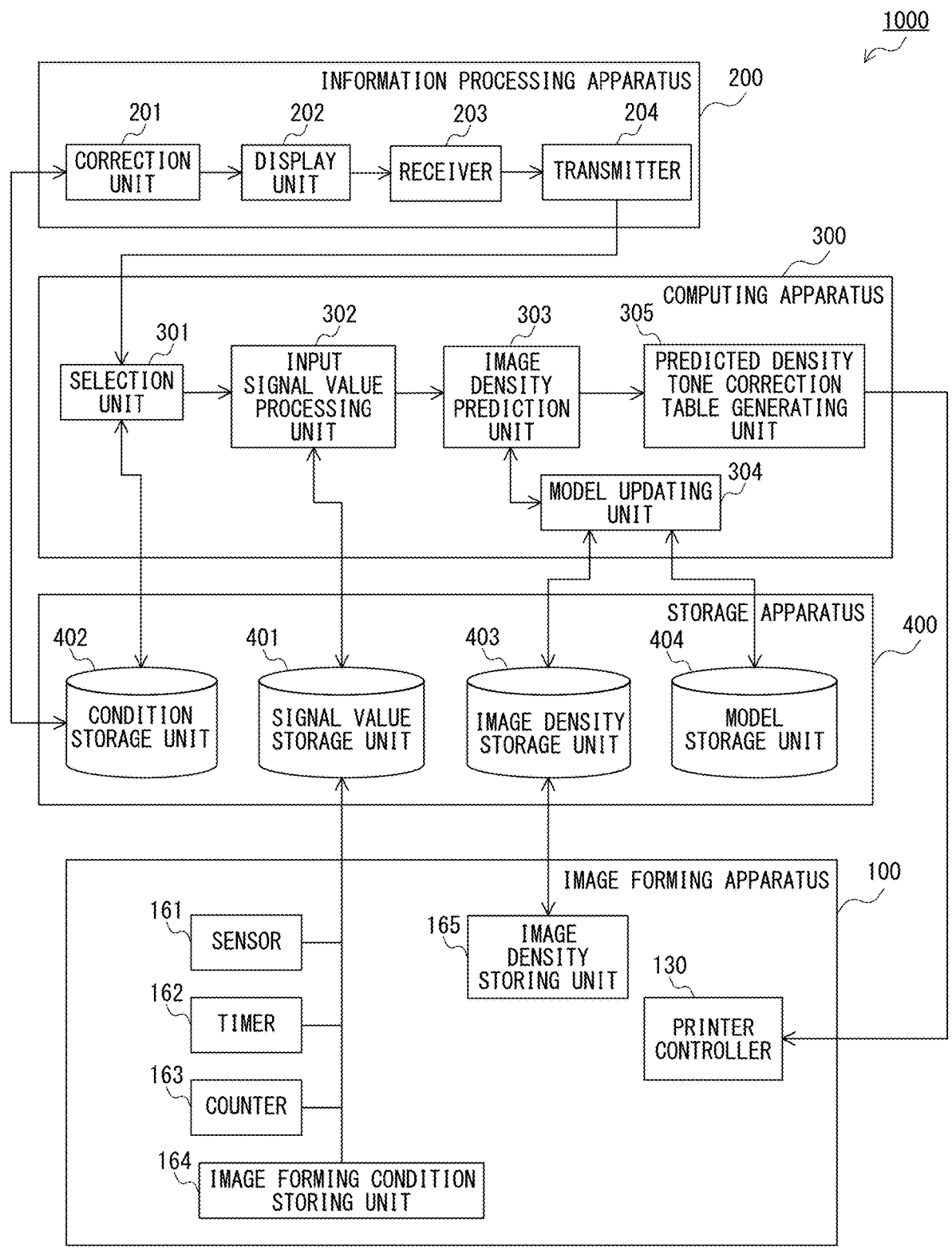
FIG. 1 is an overall configuration diagram for illustrating an image density prediction control system.

FIG. 1 is an overall configuration diagram for illustrating an image density prediction control system. An image density prediction control system 1000 includes an image forming apparatus 100, an information processing apparatus 200, a computing apparatus 300, and a storage apparatus 400. The image density prediction control system 1000 predicts, based on main-body inside information of the image forming apparatus 100, an image density of an image to be formed by the image forming apparatus 100 in a current state, and appropriately corrects the image density. Further, the image density prediction control system 1000 updates a type of a model to be used for the image density prediction periodically or at a predetermined timing in accordance with a user's instruction, to thereby perform the image density prediction with high accuracy.

The image forming apparatus 100 is an electrophotographic printer in this embodiment, but may be an inkjet printer or a dye sublimation printer. The image forming apparatus 100 acquires image data from an external apparatus connected thereto via a network or the like and forms an image on a sheet based on the image data. The image forming apparatus 100 includes a printer controller 130 for controlling image forming processing onto a sheet. Details of the image forming apparatus 100 are described later.

The storage apparatus 400 is provided to, for example, a server on a network, and is installed at a location remote to other apparatus of the image density prediction control system 1000. The storage apparatus 400 stores the main-body inside information of the image forming apparatus 100 acquired from the image forming apparatus 100. Details of the storage apparatus 400 are described later.

The information processing apparatus 200 is, for example, a smartphone or a personal computer. The information processing apparatus 200 receives operation by a user and controls operation of the image forming apparatus 100 in accordance with the operation instruction. The information processing apparatus 200 communicates to and from the storage apparatus 400 and the computing apparatus 300 via a network. Details of the information processing apparatus 200 are described later.

The computing apparatus 300 is, for example, a server on a network, and is installed at a location remote to other apparatus of the image density prediction control system 1000. The computing apparatus 300 communicates to and from the image forming apparatus 100, the information processing apparatus 200, and the storage apparatus 400 via a network. The computing apparatus 300 predicts, based on the main-body inside information of the image forming apparatus 100, an image density of an image to be formed by the image forming apparatus 100. Further, the computing apparatus 300 updates an image density prediction model. Details of the computing apparatus 300 are described later.

<Image Forming Apparatus>

Figure 2:
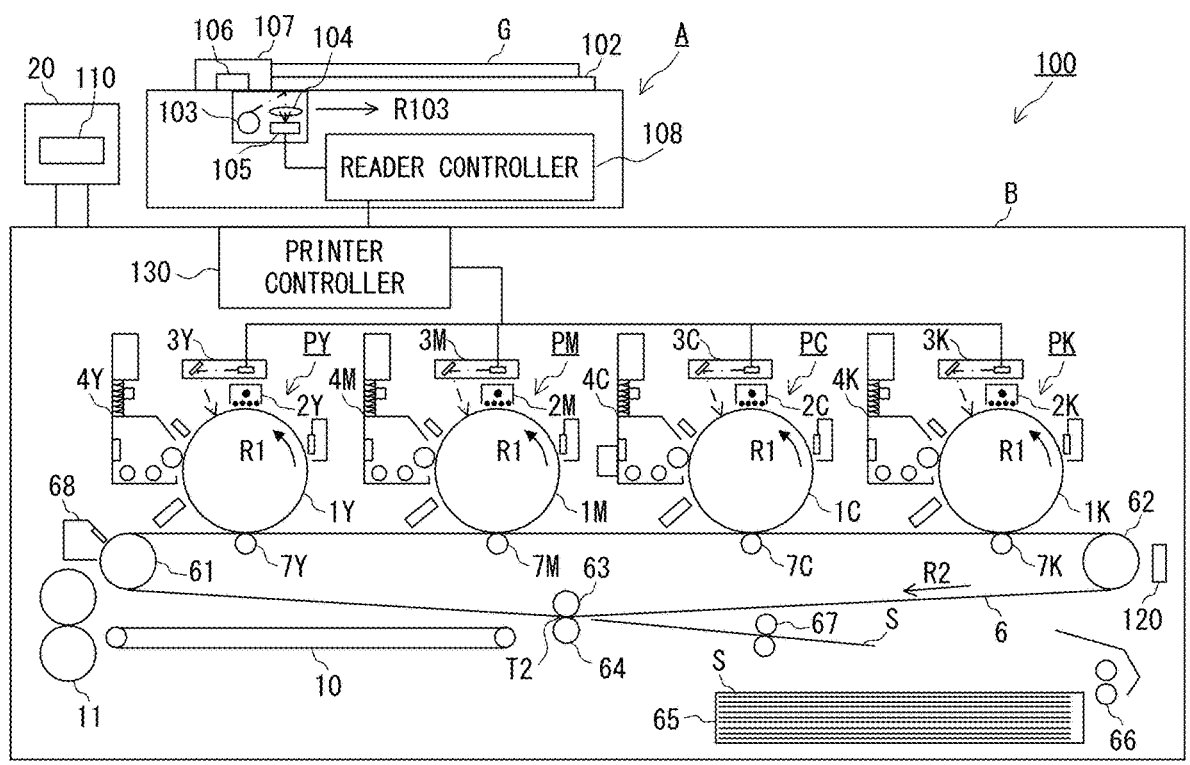
FIG. 2 is a configuration view for illustrating an image forming apparatus.

FIG. 2 is a configuration view for illustrating the image forming apparatus 100. The image forming apparatus 100 includes a reader A, a printer B, and an operation unit 20. The printer B forms an image on a sheet S. The reader A reads an image from a sheet (original G) having an image formed thereon. The operation unit 20 is a user interface. The operation unit 20 includes various key buttons or a touch panel as an input interface. The operation unit 20 includes a display unit 110 as an output interface. A user uses the operation unit 20 to give a start instruction for copying or perform various settings.

<Reader>

The reader A includes an original table glass 102 for placing the original G thereon, a light source 103 for irradiating the original G placed on the original table glass 102 with light, an optical system 104, a light receiver 105, and a reader controller 108. The light source 103, the optical system 104, and the light receiver 105 form an image reading unit for reading an image of the original G. A positioning member 107 and a reference white plate 106 are arranged at an edge portion of the original table glass 102. The positioning member 107 allows one side of the original G to be brought into abutment thereagainst to prevent oblique arrangement of the original G. The reference white plate 106 is to be used for shading correction of the image reading unit.

The optical system 104 causes reflected light, which is the light radiated from the light source 103 and reflected on the original G, to be imaged on a reading face of the light receiver 105. The light receiver 105 is, for example, a charge coupled device (CCD) sensor, and outputs an image signal obtained by converting the received reflected light into an electric signal. The light receiver 105 includes, for example, CCD sensors arranged in three rows so as to correspond to red (R), green (G), and blue (B). The light receiver 105 generates color component signals of respective colors including R, G, and B as image signals. The image reading unit reads lines of the image on the original G placed on the original table glass 102 one after another while moving in an arrow direction R103.

The image signals generated in the light receiver 105 are input to the reader controller 108. The reader controller 108 performs image processing such as A/D conversion, shading correction, and color conversion on the image signals acquired from the light receiver 105. The reader controller 108 transmits the image signals having been subjected to the image processing to the printer B. Further, the reader controller 108 controls operation of the reader A.

<Printer>

The printer B includes image forming units PY, PM, PC, and PK, an intermediate transfer belt 6, a secondary transfer roller 64, a fixing device 11, a sheet feeding cassette 65, and the printer controller 130. The printer B is a full-color printer of a tandem intermediate transfer type in which the image forming units PY, PM, PC, and PK are arranged along the intermediate transfer belt 6. The image forming unit PY forms a yellow image (toner image). The image forming unit PM forms a magenta image (toner image). The image forming unit PC forms a cyan image (toner image). The image forming unit PK forms a black image (toner image).

The intermediate transfer belt 6 is an image bearing member wrapped around and supported by a tension roller 61, a drive roller 62, and an opposing roller 63. A belt cleaner 68 is provided so as to be opposed to the tension roller 61. The intermediate transfer belt 6 is driven by the drive roller 62 to rotate in an arrow R2 direction at a predetermined process speed. The images (toner images) respectively formed by the image forming units PY, PM, PC, and PK are sequentially superimposed and transferred onto the intermediate transfer belt 6 at timings set in accordance with a rotation speed of the intermediate transfer belt 6. In this manner, a full-color image (toner image) is formed on the intermediate transfer belt 6.

The opposing roller 63 forms a secondary transfer portion T2 between the opposing roller 63 and the secondary transfer roller 64. The images having been transferred onto the intermediate transfer belt 6 are conveyed to the secondary transfer portion T2 and collectively transferred onto the sheet S. Through application of a DC voltage having a positive polarity to the secondary transfer roller 64, the image (toner image) charged to a negative polarity and borne on the intermediate transfer belt 6 is transferred onto the sheet S. A developer that remains on the intermediate transfer belt 6 after the transfer is removed by the belt cleaner 68.

Sheets S are stored in the sheet feeding cassette 65 and fed one after another. On a conveyance passage for conveying the sheets S, separation rollers 66 and registration rollers 67 are provided. The sheets S are fed from the sheet feeding cassette 65, separated into individual sheets by the separation rollers 66, and conveyed to the registration rollers 67. The registration rollers 67 receive the sheet S in a stopping state and allow the sheet S to stand by. The registration rollers 67 then convey the sheet S to the secondary transfer portion T2 in accordance with a timing at which the image on the intermediate transfer belt 6 is conveyed to the secondary transfer portion T2.

The sheet S having the image transferred thereto is conveyed by the secondary transfer roller 64 to the fixing device 11 via a conveyance belt 10. The fixing device 11 heats and pressurizes the sheet S to fix the image to the sheet S. The sheet S having the image fixed thereto is discharged to an outside of a machine body of the printer B.

Image formation performed by the image forming units PY, PM, PC, and PK is described. The image forming units PY, PM, PC, and PK are different only in color of the developer (here, which is toner) to be used for development, and perform the same operation with the same configuration. In the following description, letters Y, M, C, and K are added to ends of the reference symbols when the colors are distinguished, and the letters Y, M, C, and K at the ends of the reference symbols are omitted when the colors are not distinguished.

The image forming unit P includes a photosensitive drum 1, a charging device 2, an exposing device 3, a developing device 4, and a primary transfer roller 7. The intermediate transfer belt 6 is sandwiched between the photosensitive drum 1 and the primary transfer roller 7.

The photosensitive drum 1 is an image bearing member having a configuration in which a photosensitive layer having a negative charging polarity is formed on an outer peripheral surface of an aluminum cylinder. The photosensitive drum 1 rotates in an arrow R1 direction about a drum shaft at a predetermined process speed. The photosensitive drum 1 is an OPC photosensitive member having a reflectance of about 40% with respect to far-red light (960 nm). The photosensitive drum 1 may be, for example, an amorphous-silicon-based photosensitive member having substantially the same reflectance.

The charging device 2 is a scorotron charging device in this embodiment, which irradiates the photosensitive drum 1 with charged particles generated by corona discharge to charge the photosensitive layer on the surface of the photosensitive drum 1 to a uniform negative electric potential. The scorotron charging device includes a wire applied with a high voltage, a grounded shield portion, and a grid portion applied with a desired voltage. A predetermined charging bias voltage is applied to the wire of the charging device 2 from a charging bias power source (not shown). A predetermined grid bias voltage is applied to the grid portion of the charging device 2 from a grid bias power source (not shown). Although it depends on the voltage applied to the wire, the photosensitive drum 1 is charged substantially to the voltage applied to the grid portion.

The exposing device 3 scans the charged photosensitive drum 1 by reflecting a laser beam with a rotary mirror, to thereby form an electrostatic latent image on the surface of the photosensitive drum 1. In a case where an electric potential sensor (not shown) is provided in the vicinity of the photosensitive drum 1, an electric potential of the electrostatic latent image formed on the photosensitive drum 1 is detected by the electric potential sensor. The developing device 4 is applied with a developing bias voltage so as to cause toner serving as a developer to adhere to the electrostatic latent image on the photosensitive drum 1, thereby forming an image (toner image) on the photosensitive drum 1.

The primary transfer roller 7 presses an inner surface of the intermediate transfer belt 6 to form a primary transfer portion between the photosensitive drum 1 and the intermediate transfer belt 6. Through application of the DC voltage having a positive polarity to the primary transfer roller 7, the toner image having a negative polarity borne on the photosensitive drum 1 is transferred onto the intermediate transfer belt 6 passing through the primary transfer portion. As described above, the image forming unit P forms a toner image of a corresponding color to the photosensitive drum 1 and transfers the formed toner image from the photosensitive drum 1 onto the intermediate transfer belt 6.

On a downstream side of the image forming unit PK in a rotation direction of the intermediate transfer belt 6, an image density sensor 120 serving as an image sensor is arranged at a position opposed to the drive roller 62 across the intermediate transfer belt 6. The image density sensor 120 measures an image density of an unfixed toner image having been transferred onto the intermediate transfer belt 6. The image density sensor 120 may have a configuration for measuring an image density of the toner image on the photosensitive drum 1 in addition to the configuration for measuring the image density of the toner image on the intermediate transfer belt 6. Further, the image density sensor 120 may be arranged on a downstream side of the fixing device 11 in a conveyance direction of the sheet S so as to measure an image density of the image fixed to the sheet S.

(Printer Controller)

Figure 3:
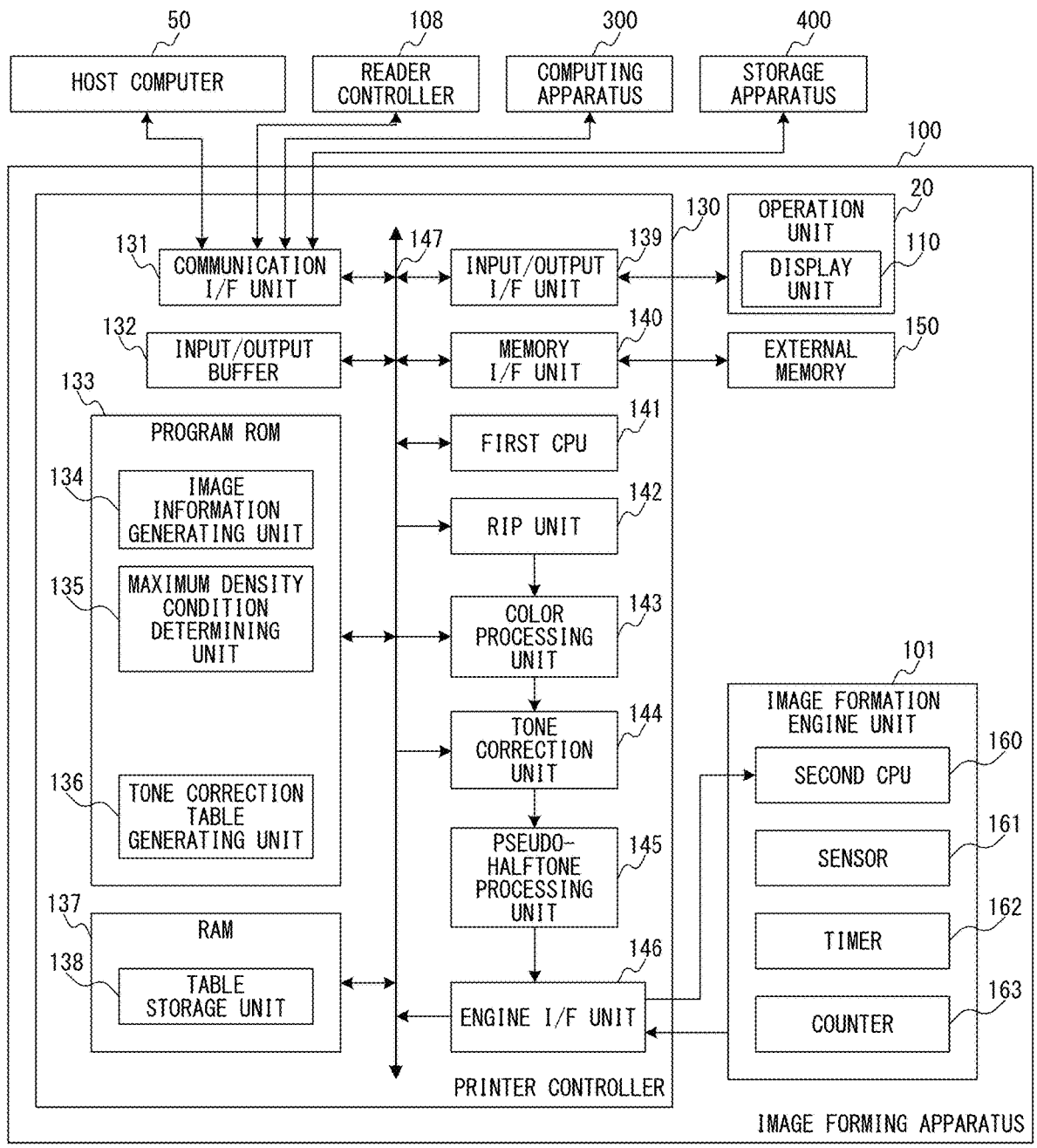
FIG. 3 is an explanatory diagram for illustrating a printer controller.

FIG. 3 is an explanatory diagram for illustrating the printer controller 130. The printer controller 130 is communicably connected to the reader controller 108, the computing apparatus 300, the storage apparatus 400, and a host computer 50 provided outside the image forming apparatus 100. Further, the printer controller 130 is connected to the operation unit 20, an external memory 150, and an image formation engine unit 101.

The printer controller 130 controls overall operation of the image forming apparatus 100. The printer controller 130 includes a communication interface (I/F) unit 131, an input/output buffer 132, an input/output I/F unit 139, and a memory I/F unit 140. The printer controller 130 includes a first central processing unit (CPU) 141, a program read-only memory (ROM) 133, and a random access memory (RAM) 137. The printer controller 130 includes a raster image processor (RIP) unit 142, a color processing unit 143, a tone correction unit 144, a pseudo-halftone processing unit 145, and an engine I/F unit 146. Those components of the printer controller 130 are connected to a system bus 147 so that data can be mutually communicated.

The communication I/F unit 131 controls communication to and from the reader controller 108, the computing apparatus 300, the storage apparatus 400, and the image forming apparatus 100. The input/output I/F unit 139 controls communication to and from the operation unit 20. The input/output I/F unit 139 receives an instruction or the like input through the operation unit 20 and displays various pieces of information on the display unit 110. The memory I/F unit 140 controls communication to and from the external memory 150 which is used for storing, for example, print data or various pieces of information of the image forming apparatus 100. The input/output buffer 132 temporarily stores, for example, a control code received by the communication I/F unit 131 and data communicated by the input/output I/F unit 139 and the memory I/F unit 140.

The first CPU 141 executes a computer program stored in the program ROM 133 to control operation of the image forming apparatus 100. The RAM 137 provides a working area to be used in a case where the first CPU 141 executes the computer program. The program ROM 133 stores, for example, a computer program and control data. In a case where the first CPU 141 executes the computer program, the program ROM 133 functions as an image information generating unit 134, a maximum density condition determining unit 135, and a tone correction table generating unit 136.

The image information generating unit 134 generates various image objects in accordance with data (image signal) acquired from the host computer 50 or the reader controller 108. The maximum density condition determining unit 135 performs maximum density adjustment. The tone correction table generating unit 136 generates a tone correction table (γ look-up table (LUT)) to be used for tone correction on an image. The RAM 137 includes a table storage unit 138 for temporarily storing processing results of the maximum density condition determining unit 135 and the tone correction table generating unit 136.

The RIP unit 142 generates image data obtained by expanding the image object generated by the image information generating unit 134 into a bitmap image. The color processing unit 143 performs multi-dimensional color conversion processing on the image data. The tone correction unit 144 performs, through use of the γLUT, single-color tone correction on the image data having been subjected to the color conversion processing.

The pseudo-halftone processing unit 145 performs pseudo-halftone processing, such as a dither matrix or an error diffusion method, on the image data having been subjected to the tone correction. The pseudo-halftone processing unit 145 performs halftone processing suitable for a kind of image on the image data having been converted by the tone correction unit 144. The pseudo-halftone processing unit 145 performs halftone processing with use of an image screen on image data relating to an image or image data relating to graphics such that a picture or a figure is formed into an image having excellent tones. The pseudo-halftone processing unit 145 performs the halftone processing with use of a text screen on the image data relating to a text such that characters are clearly printed. The pseudo-halftone processing unit 145 performs the halftone processing with use of the error diffusion method in a case where a user selects the error diffusion method.

The image data having been processed by the RIP unit 142, the color processing unit 143, the tone correction unit 144, and the pseudo-halftone processing unit 145 is transmitted to the image formation engine unit 101 via the engine I/F unit 146. The image formation engine unit 101 controls operation of the image forming units PY, PM, PC, and PK based on the image data acquired from the printer controller 130 to form an image on the sheet S.

The image formation engine unit 101 includes a second CPU 160, a sensor 161, a timer 162, and a counter 163. The second CPU 160 controls operation of the printer B to control image forming processing on the sheet S. Signal values output from the sensor 161, the timer 162, and the counter 163 are used for processing of predicting an image density. The sensor 161 is, for example, an environment sensor which is provided inside the image forming apparatus 100 to detect environment information (temperature or humidity) of the image forming apparatus 100. The sensor 161, the timer 162, and the counter 163 are detection units configured to detect environment conditions given at the time of image formation, and the signal values output respectively from the sensor 161, the timer 162, and the counter 163 indicate a change in environment conditions given at the time of image formation.

<Storage Apparatus>

The storage apparatus 400 of FIG. 1 includes a signal value storage unit 401, an image density storage unit 402, a condition storage unit 403, and a model storage unit 404.

The signal value storage unit 401 acquires various signal values representing a state of the image forming apparatus 100 from the sensor 161, the timer 162, and the counter 163 included in the image forming apparatus 100 and stores the signal values. Further, the signal value storage unit 401 acquires image forming conditions such as a current exposure intensity (hereinafter referred to as "LPW"), a current charging electric potential (hereinafter referred to as "Vd"), and the like in the image forming apparatus 100 from an image forming condition storing unit 164 of the image forming apparatus 100 and stores the image forming conditions. The pieces of data stored in the signal value storage unit 401 are hereinafter collectively referred to as "input data" to be used for prediction of the image density.

The image density storage unit 402 stores data relating to the density (image density signal value) acquired from the image density sensor 120 or the reader A of the image forming apparatus 100. The data (image density signal value) is stored also in an image density storing unit 165 of the image forming apparatus 100. The data stored in the image density storage unit 402 is hereinafter referred to as "teaching data."

The model storage unit 404 stores coefficients of an image density prediction model described later.

The condition storage unit 403 stores a plurality of sets of input data stored in the signal value storage unit 401 and teaching data stored in the image density storage unit 402. The sets of input data and teaching data are each stored in a state of being linked to date/time information and print condition information. The date/time information corresponds to the date and time of acquisition of the data. The print condition information includes, for example, environment conditions (temperature and humidity information) of an environment in which the image forming apparatus 100 is installed, toner color material amount information of image data, toner amount information of the image forming unit P, paper type information given at the time of executing a print job, and the presence or absence of an error at the time of executing a print job. Here, the environment conditions (temperature and humidity information) are described as an example of the print condition information. The date/time information and the print condition information are pieces of information included in the input data.

FIG. 4 is an explanatory table for showing information stored in the condition storage unit 403. In FIG. 4, the input data stored in the signal value storage unit 401 is shown as data pieces A, B, C, . . . , I, and the teaching data stored in the image density storage unit 402 is shown as data pieces 1, 2, 3, . . . , 5. The data corresponding to the number 1 of FIG. 4 includes the data acquisition date and time of "2020/10/10 8:52:39" and the environment conditions of the image forming apparatus 100 including a temperature of 22° C. and a humidity of 61%. The input data is stored as a data set A in the signal value storage unit 401. The teaching data is stored as a data set 1 in the image density storage unit 402. A data set of a combination of input data and corresponding teaching data is hereinafter referred to as "image density prediction model update data set."

In the example of FIG. 4, the input data and the teaching data are associated with each other at the numbers 1, 3, 5, 7, and 9. Thus, a combination of each input data piece and each teaching data piece at the numbers 1, 3, 5, 7, and 9 corresponds to an image density prediction model update data set. Further, in a case where the storage apparatus 400 acquires only the input data (numbers 2, 4, 6, and 8), the date/time information, the print condition information, and the input data are stored in association with each other.

<Information Processing Apparatus>

Figure 5:
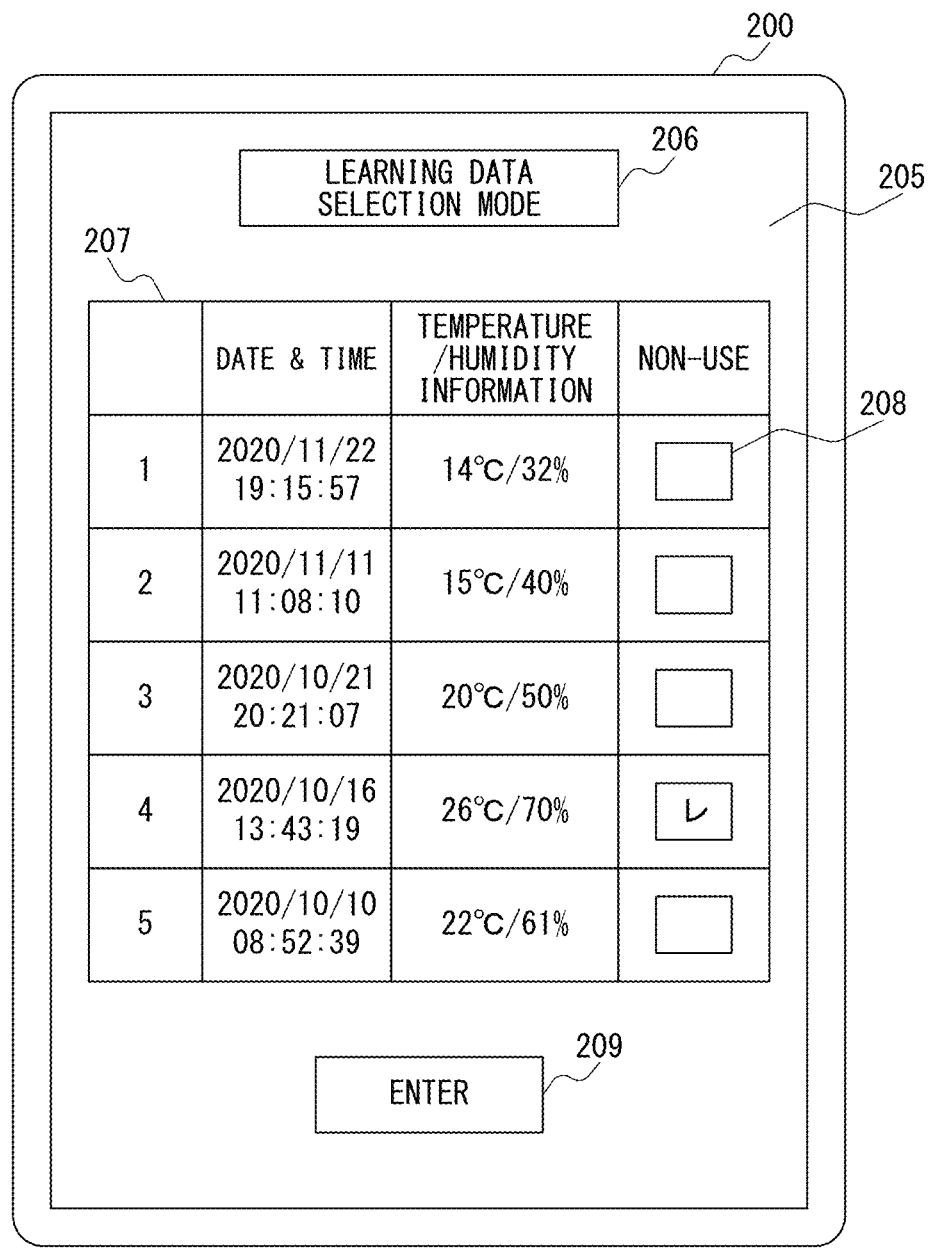
FIG. 5 is an exemplary view for illustrating an application screen.

The information processing apparatus 200 of FIG. 1 includes a collection unit 201, a display unit 202, a receiver 203, and a transmitter 204. FIG. 5 is an exemplary view for illustrating an application screen to be displayed by the display unit 202 in a case where the information processing apparatus 200 executes a predetermined application program. A user can operate this application screen. This application screen is a screen showing a case in which a "learning data selection mode" is selected as one of functions of the application program.

The collection unit 201 collects the date/time information and the print condition information of each data set of the image density prediction model update data set from the condition storage unit 403 of the storage apparatus 400. In the example of FIG. 4, the collection unit 201 collects the date/time information and the print condition information corresponding to the numbers 1, 3, 5, 7, and 9.

The display unit 202 includes a liquid crystal panel 205 of a touch panel type as illustrated in FIG. 5. In FIG. 5, a learning data selection mode screen 206 is displayed as an application screen on the liquid crystal panel 205. The learning data selection mode screen 206 displays, as a learning data list 207, the date/time information and the print condition information of each data set of the image density prediction model update data set collected by the collection unit 201. On the learning data list 207, the date/time information and the environment information (temperature/humidity information) of the image density prediction model update data set of FIG. 4 stored in the condition storage unit 403 are displayed in time order from the latest data.

Further, a non-use check box 208 is provided to each item of the learning data list 207. An enter button 209 is provided in a lower part of the learning data selection mode screen 206. When the non-use check box 208 is checked, and the enter button 209 is then pressed, the checked data set is not used as data for updating the image density prediction model. For example, in the learning data list 207 exemplified in FIG. 5, the non-use check box 208 is checked so that the data set of "2020/10/16/13:43:19, 26° C./70%" at the number 4 is not to be used. This indicates that, at the time of updating the image density prediction model, the image density prediction model update data set with respect to the number 4 is not used, and the image density prediction model is updated with use of the numbers 1, 2, 3, and 5 which are not checked.

The receiver 203 receives operation by a user selecting a data set to be used for the image density prediction model. As described above, the user checks the non-use check box 208 of the image density prediction model update data set which is not used for prediction of the image density from a plurality of image density prediction model update data sets (log data) displayed on the learning data list 207, and presses the enter button 209. In a case where the enter button 209 is selected, the selected information of the image density prediction model update data set used for updating the image density prediction model is transmitted to the transmitter 204. The selected information is user instruction information relating to a result of selecting the data set which is not used for updating (generating) the image density prediction model.

The transmitter 204 transmits the selected information of the image density prediction model update data set acquired from the receiver 203 to the computing apparatus 300 connected via a network or the like. In this embodiment, as the image density prediction model update data set, the selected information indicating that the numbers 1, 2, 3, and 5 of the learning data list 207 are used is transmitted to the computing apparatus 300.

<Computing Apparatus>

The computing apparatus 300 of FIG. 1 includes a selection unit 301, an input signal value processing unit 302, an image density prediction unit 303, a model updating unit 304, and a predicted density tone correction table generating unit 305.

The selection unit 301 selects the input data and the teaching data to be used for the image density prediction model based on the selected information of the image density prediction model update data set acquired from the transmitter 204 of the information processing apparatus 200 and the information stored in the condition storage unit 403. The selection unit 301 selects the input data and the teaching data from pieces of data respectively stored in the signal value storage unit 401 and the image density storage unit 402.

In the example of FIG. 5, the selected information of the image density prediction model update data set acquired from the transmitter 204 corresponds to the numbers 1, 2, 3, and 5 in the learning data list 207. Those pieces of information match the data acquisition date and time of the numbers 9, 7, 5, and 1 of the condition storage unit 403 shown in FIG. 4. That is, the pieces of information of the numbers 1, 2, 3, and 5 selected in the information processing apparatus 200 correspond to the numbers 9, 7, 5 and 1 of the condition storage unit 403 as well as the data pieces I, G, E, and A of the signal value storage unit 401 and the data pieces 5, 4, 3, and 1 of the image density storage unit 402.

Thus, in order to update the image density prediction model, the data pieces I, G, E, and A are used as the input data, and the data pieces 5, 4, 3, and 1 are used as the teaching data. The selection unit 301 transmits the information of the input data to the input signal value processing unit 302 and the model updating unit 304, and transmits the information of the teaching data to the model updating unit 304.

Based on the information acquired from the selection unit 301, the input signal value processing unit 302 acquires corresponding input data from the signal value storage unit 401, and derives differences from a basic signal value described later. In this example, the input signal value processing unit 302 acquires the data pieces I, G, E, and A from the signal value storage unit 401, and calculates respective differences from the basic signal value. The signal values having been processed by the input signal value processing unit 302 are input to the image density prediction unit 303.

The image density prediction unit 303 applies the signal values acquired from the input signal value processing unit 302 to the image density prediction model described later, to thereby calculate an image density change amount from a basic image density (basic density value). The image density prediction unit 303 calculates a current predicted image density of the image forming apparatus 100 based on the calculated image density change amount and the basic density value. For example, the image density prediction unit 303 adds up the calculated image density change amount and the basic density value to calculate the current predicted image density. That is, the image density prediction unit 303 acquires the data pieces I, G, E, and A from the signal value storage unit 401 as the input data, and applies those data pieces to the image density prediction model, to thereby calculate the image density change amount from the basic density value and the predicted image density of the image forming apparatus 100. The predicted image density having been calculated by the image density prediction unit 303 is input to the predicted density tone correction table generating unit 305.

The predicted density tone correction table generating unit 305 generates a tone correction table (γLUT) to be used for tone correction based on the predicted image density acquired from the image density prediction unit 303. The tone correction method is described later. In the tone correction table generating unit 136 included in the image forming apparatus 100, the tone correction table is generated with use of an actually measured image density value acquired through actual measurement control described later. In contrast, the predicted density tone correction table generating unit 305 of the computing apparatus 300 calculates a tone correction table with use of the predicted image density calculated by the image density prediction unit 303.

The model updating unit 304 updates the image density prediction model for allowing the image density prediction unit 303 to calculate a predicted image density. Although the updating of the image density prediction model is described later, a new image density prediction model is generated by adding data sets for updating to the image density prediction model update data set which has been used to create a current image density prediction model. For example, the model updating unit 304 adds the data set of the data pieces I, G, E, and A of the signal value storage unit 401 and the data pieces 5, 4, 3, and 1 of the image density storage unit 402 selected in the selection unit 301 to the current image density prediction model, to thereby update the image density prediction model. The model updating unit 304 stores the generated image density prediction model in the model storage unit 404 of the storage apparatus 400.

<Acquisition of Basic Signal Value and Basic Density Value>

Figure 6:
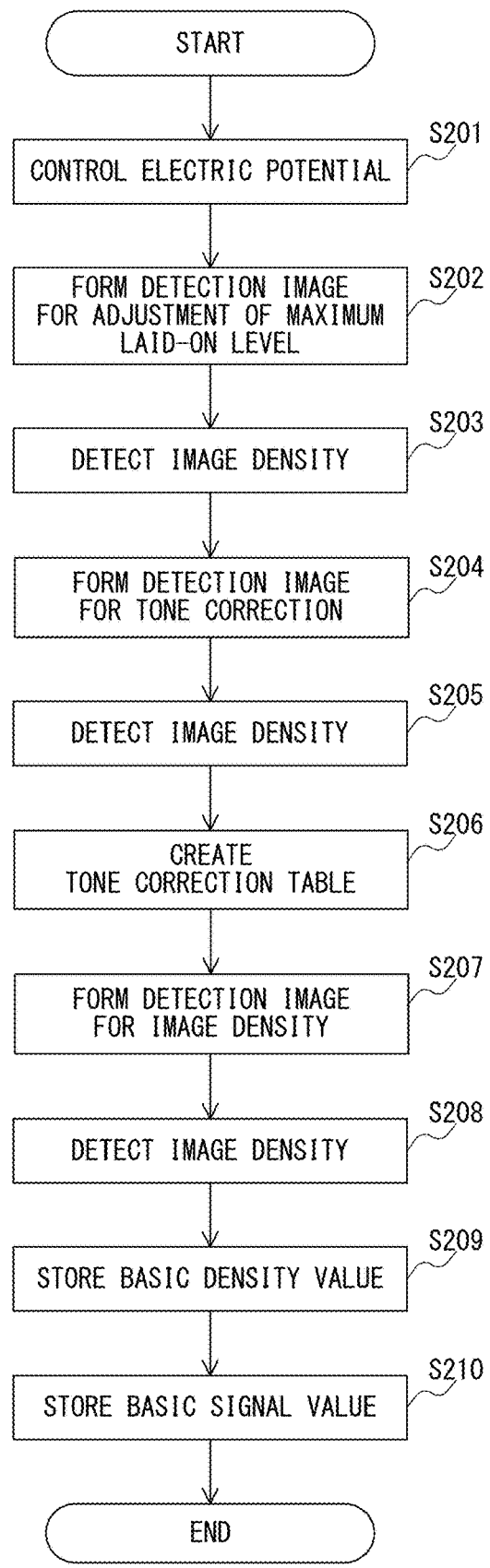
FIG. 6 is a flowchart for illustrating acquisition processing for a basic density value.

Description is made of an acquisition method performed by the image density prediction unit 303 to acquire a basic signal value stored in the signal value storage unit 401 and a basic density value (image density signal value) stored in the image density storage unit 402. The basic density value used in this embodiment is periodically acquired through automatic tone correction control using an output image formed on the sheet S. FIG. 6 is a flowchart for illustrating acquisition processing for the basic density value. In this embodiment, the acquisition method is described based on a configuration having an electric potential sensor (not shown) for measuring an electric potential on the surface of the photosensitive drum 1, but the acquisition method is not limited to this.

Electric Potential Control

In a case where the automatic tone correction control is started, first, the printer controller 130 performs electric potential control processing with the image formation engine unit 101 (Step S201). Before an image is formed on the sheet S, the image formation engine unit 101 determines a charging electric potential VdT as a target of the electric potential control, a grid bias Y, and a developing bias Vdc. Through the electric potential control processing, a charging electric potential and the like corresponding to environment conditions (including conditions of temperature and humidity) of the environment in which the image forming apparatus 100 is installed are determined.

Figure 7:
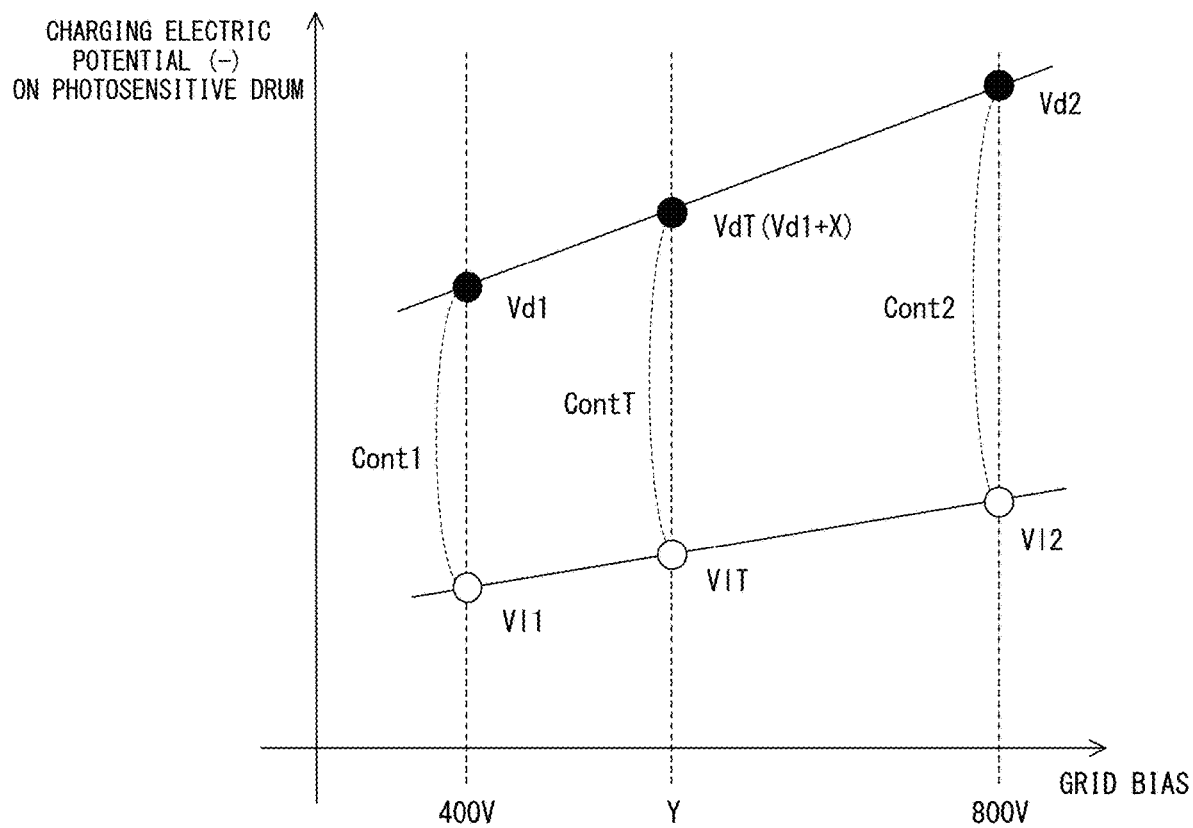
FIG. 7 is an explanatory graph for showing electric potential control performed through two-point electric potential control.

In this embodiment, the image formation engine unit 101 performs electric potential control called "two-point electric potential control." FIG. 7 is an explanatory graph for showing electric potential control through the two-point electric potential control. The Vd1 indicates a charging electric potential given under a first charging condition (grid bias 400 V), and the Vl1 indicates an exposure part electric potential formed with standard laser power. The Vd2 indicates a charging electric potential given under a second charging condition (grid bias 800 V), and the Vl2 indicates an exposure part electric potential formed with standard laser power given at that time. In this case, contrast electric potentials (Cont1 and Cont2) given with the grid biases of 400 V and 800 V can be calculated with the following Expressions (1) and (2).

$$Cont1 = Vd1 - Vl1 \quad (1)$$

$$Cont2 = Vd2 - Vl2 \quad (2)$$

A change amount ContΔ of the contrast potential due to a change in charging electric potential by 1 V can be calculated with the following Expression (3) based on results of the Expressions (1) and (2).

$$Cont\Delta = (Cont2 - Cont1)/(Vd2 - Vd1) \quad (3)$$

The sensor 161 included in the image forming apparatus 100 is an environment sensor and detects environment conditions, such as temperature and humidity. The printer controller 130 determines a target contrast electric potential ContT corresponding to the environment conditions based on an environment table registered in advance. A relationship between the target contrast electric potential ContT and the increase amount ContΔ of the contrast electric potential can be calculated with the following Expression (4).

$$ContT = Cont1 + X \cdot Cont\Delta \quad (4)$$

As a result of calculating a parameter X satisfying the relationship of the Expression (4), the charging electric potential VdT being a target (hereinafter referred to as "target electric potential") can be calculated with the following Expression (5).

$$VdT = Vd1 + X \quad (5)$$

A change amount VdΔ of the charging electric potential due to a change in grid bias by 1 V can be calculated with the following Expression (6).

$$Vd\Delta = (Vd2 - Vd1)/(800 - 400) \quad (6)$$

The grid bias Y that gives the target electric potential VdT can be calculated with the following Expression (7).

$$VdT = 400 + Y \cdot Vd\Delta \quad (7)$$

The change amount VdΔ of the Expression (7) can be calculated with the Expression (6), and the target electric potential VdT can be calculated with the Expression (5). Thus, through substitution of a known electric potential into the Expression (5) and the Expression (6), the grid bias Y satisfying the relationship of the Expression (7) can be finally determined.

As a result of the processing described above, the target electric potential VdT and the grid bias Y corresponding to the environment conditions are determined. The developing bias Vdc has a prescribed electric potential difference with respect to the target electric potential VdT, and can be calculated by subtracting the prescribed electric potential from the determined target electric potential VdT. Subsequent image formation is performed with the determined developing bias Vdc. Although the charging electric potential on each photosensitive drum 1 is negative, the negative sign is omitted here for ease of understanding of the calculation process. The electric potential control processing of Step S201 is performed in the manner described above.

Adjustment of Maximum Toner Laid-on Level

After the electric potential control processing is terminated, the printer controller 130 performs adjustment processing for a maximum toner laid-on level with the image formation engine unit 101. The image formation engine unit 101 forms, on the sheet S, a detection image for adjustment of a maximum laid-on level of toner with use of the grid bias Y and the developing bias Vdc determined in the electric potential control processing (Step S202). In the printer B attaching importance to productivity, the maximum laid-on level can also be adjusted with only the electric potential control without the subsequent processing. However, a color material charge holding amount or a mixture ratio of toner and carrier in the developing device 4 may also be changed due to an environment or an elapse of time, and hence the adjustment of the maximum laid-on level with only the electric potential control is low in accuracy. Thus, in this embodiment, the detection image is formed with changes in the exposure intensity (LPW) in several stages, and the LPW to be used for normal image formation is determined.

Figure 8:
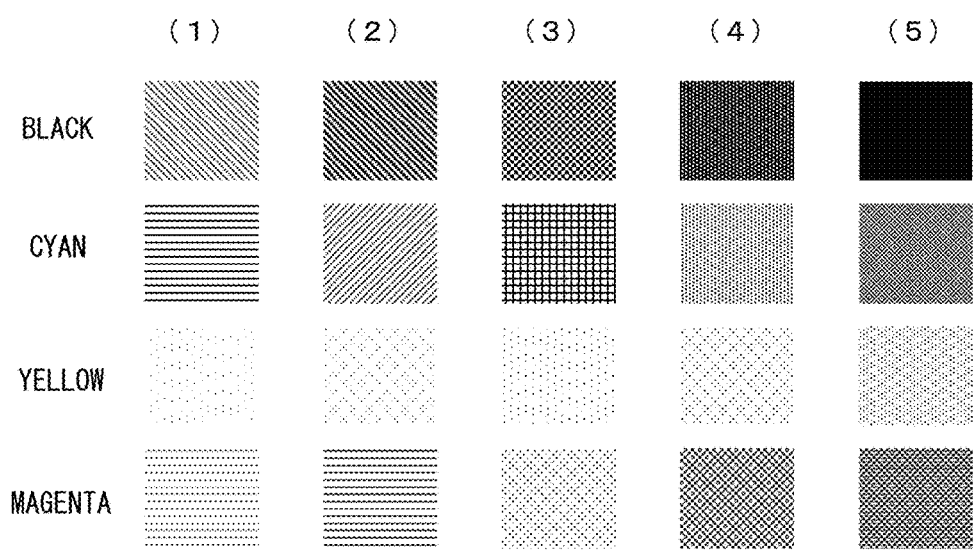
FIG. 8 is an exemplary view for illustrating a detection image.

The image formation engine unit 101 having determined the grid bias Y and the developing bias Vdc forms a detection image on the sheet S to perform adjustment of the maximum laid-on level. FIG. 8 is an exemplary view for illustrating the detection image. The detection image includes five test images (1) to (5) for each of the colors of black, cyan, yellow, and magenta. The number of test images is not limited to this. Forming conditions for the five test images have different LPWs. There are given LPW1, LPW2, LPW3, LPW4, and LPW5 in the stated order from the test image located on the left. The LPW3 corresponds to standard laser power used for the electric potential control. The laser power becomes higher in the ascending order from the LPW1 to the LPW5.

Figure 9:
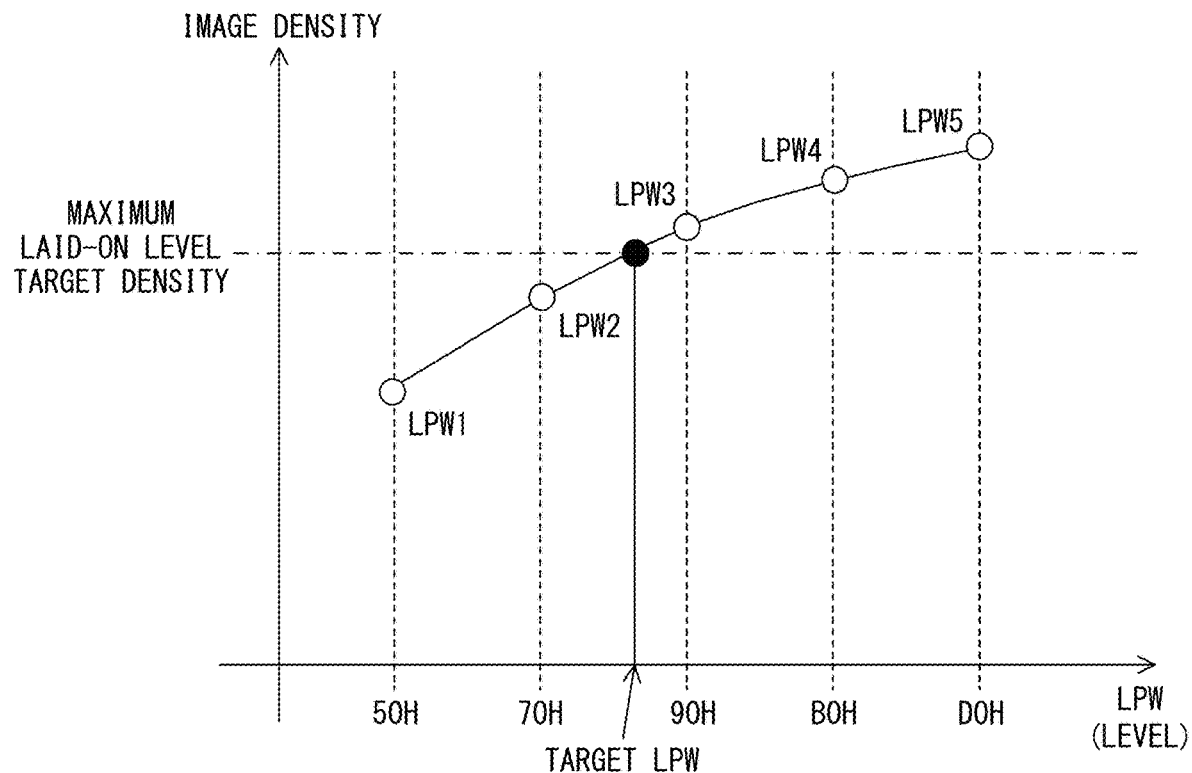
FIG. 9 is a graph for showing a relationship between an image density value of each test image and an LPW.

The sheet S having the detection image formed thereon is placed on the original table glass 102 of the reader A by a user, and respective image densities of the test images are automatically detected (Step S203). In the processing of Step S203, the reader A functions as an image sensor for measuring image densities of the test images. FIG. 9 is a graph for showing a relationship between the image density value of each test image and the LPW. The printer controller 130 is capable of adjusting the toner laid-on level by controlling the LPW through setting of the detected image density value to a density target value being a target (hereinafter referred to as "maximum laid-on level target density value").

Correction of Tone and Acquisition of Basic Density Value

After the adjustment of the maximum laid-on level is terminated, the printer controller 130 performs tone correction with the image formation engine unit 101. The image formation engine unit 101 forms a detection image for tone correction on the sheet S with use of the grid bias Y and the developing bias Vdc determined in the electric potential control processing (Step S204). In this embodiment, a detection image formed of test images of sixty-four tones is formed on the sheet S. However, the number of tones is not limited to this example.

Figure 10:
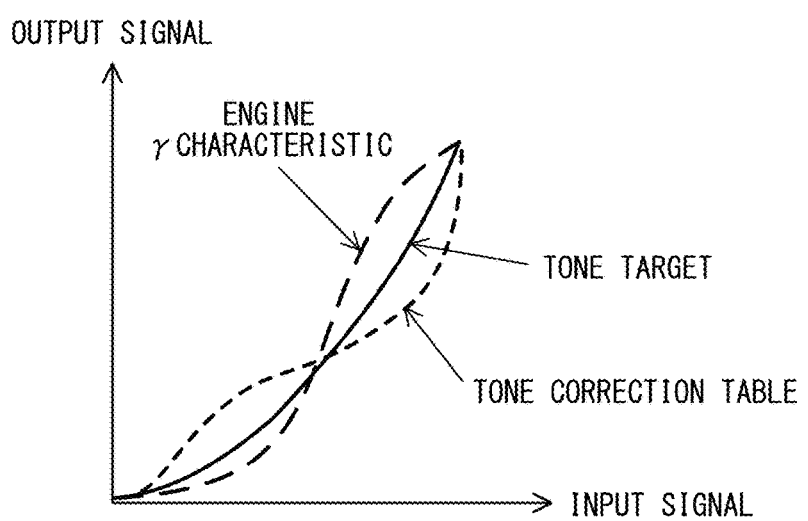
FIG. 10 is an explanatory graph for showing a tone correction table.

The sheet S having the detection image formed thereon is placed on the original table glass 102 of the reader A by a user, and respective image densities of the test images are automatically detected (Step S205). In the processing of Step S205, the reader A functions as an image sensor for measuring image densities of the test images. The printer controller 130 performs interpolation processing and smoothing processing on the respective image densities acquired from the test images, to thereby acquire an engine γ characteristic over the entire image density region. The printer controller 130 creates a tone correction table for converting an input image signal into an output image signal with use of the acquired engine γ characteristic and a preset tone target (Step S206). FIG. 10 is an explanatory graph for showing the tone correction table. In this embodiment, the tone correction table is created by subjecting the engine γ characteristic to reverse conversion so that the engine γ characteristic matches the tone target. Through the tone correction, the image density of the image formed on the sheet S matches the tone target over the entire image density region.

The printer controller 130 forms, with use of the created tone correction table, a detection image for the image density on the intermediate transfer belt 6 with the image formation engine unit 101 (Step S207). The printer controller 130 detects the image density of the detection image on the intermediate transfer belt 6 with the image density sensor 120 (Step S208). The detected image density value becomes a target density on the intermediate transfer belt 6 and is stored as a basic density value in the image density storage unit 402 (Step S209). In this embodiment, the detection image including test images having ten tones for each color is formed on the image transfer belt 6 after the tone correction table is created. The image density value of the detection image is detected with use of the image density sensor 120. The detection result is stored as the basic density value in the image density storage unit 402.

The signal values and the image forming conditions given at the time of the automatic tone correction and at the time of acquisition of the basic density value are stored as basic signal values in the signal value storage unit 401 (Step S210). The signal values are signal values output from the sensor 161, the timer 162, and the counter 163. The image forming conditions are, for example, the grid bias Y, the developing bias Vdc, and the LPW levels.

In this embodiment, the image density prediction model is provided as a model for predicting the image density of the test images on the intermediate transfer belt 6, and hence the basic image density value is the image density value measured on the intermediate transfer belt 6. However, for example, in the case of a model for predicting the image density of the test images on the sheet S, the basic image density value is the image density value measured on the sheet S. The basic density value may suitably be selected depending on a position of the test image whose image density is to be handled by the image density prediction model, and is not limited to the above-mentioned content.

<Creation Method for LUT at the Time of Outputting Image>

A description is made of a method of reflecting the calculated image density value to the LUT given at the time of outputting an image.

The printer controller 130 creates a tone correction table (hereinafter referred to as "basic correction LUT") in accordance with the engine γ characteristics so that the preset tone target (hereinafter referred to as "tone LUT") is obtained at the time of the automatic tone correction performed in accordance with an instruction given by a user. After that, the printer controller 130 acquires basic density values of ten tones for each color. After the automatic tone correction, the printer controller 130 corrects the input image signal with the basic correction LUT and transmits the resultant to the image formation engine unit 101. The image formation engine unit 101 forms an image on the sheet S based on the corrected input image signal. In this manner, an image corresponding to the tone LUT is formed.

After that, the printer controller 130 performs the image density correction control at the timing at which the starting condition for the image density correction control is satisfied, such as at the time of turning on the power, at the time of returning from a sleep state, at the time of a change in the environment, or at the preset timing. The printer controller 130 acquires the image density value at the timing at which the starting condition for the image density correction control is satisfied, and creates the LUT given at the time of outputting an image (hereinafter referred to as "composite correction LUT") based on the acquired image density value.

Figure 11:
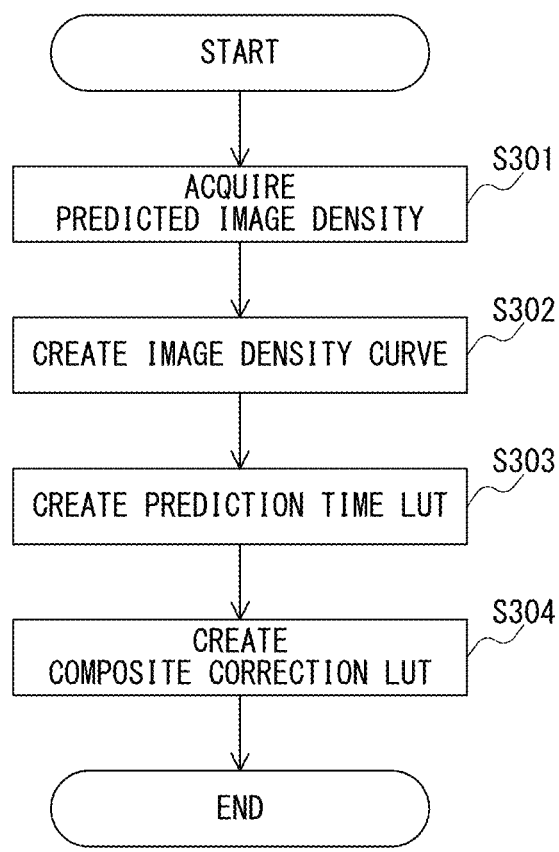
FIG. 11 is an explanatory chart for illustrating a creation method for a composite correction LUT.

FIG. 11, FIG. 12, FIG. 13, and FIG. 14 are an explanatory chart and explanatory graphs for showing the creation method for the composite correction LUT. FIG. 11 is a flowchart for illustrating the creation method for the composite correction LUT.

Figure 12:
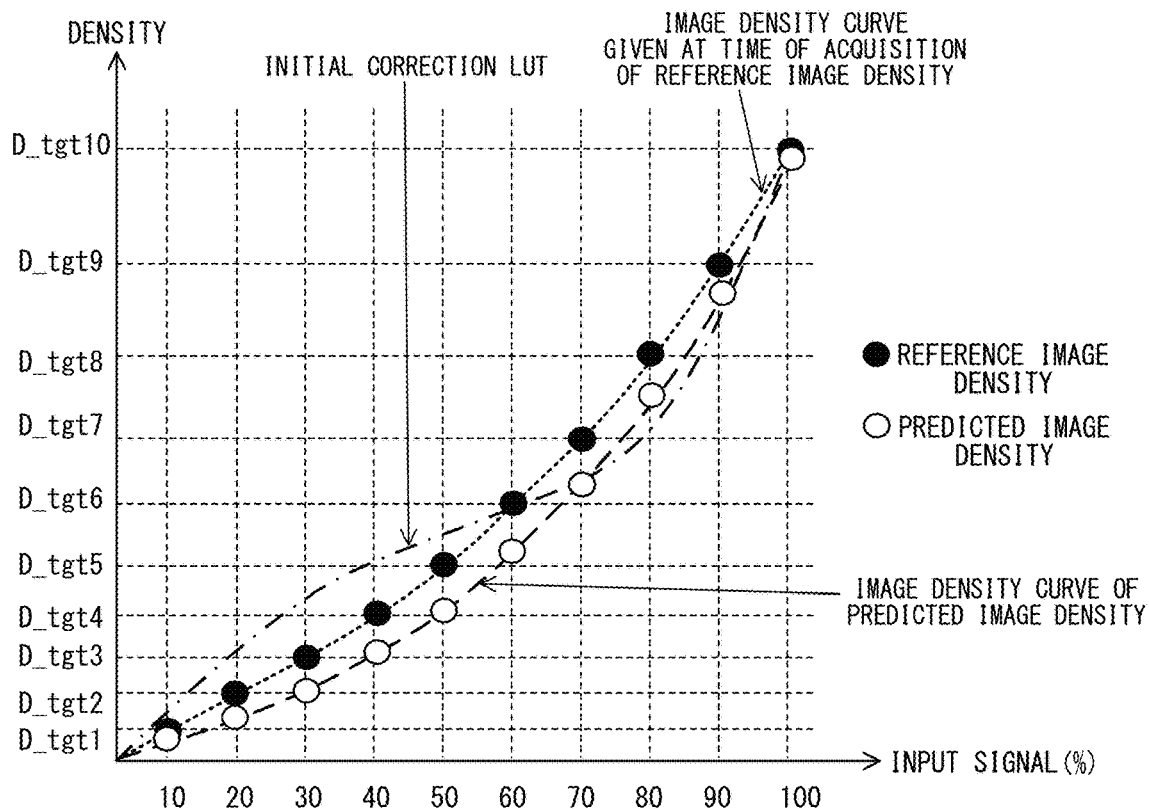
FIG. 12 is an explanatory graph for showing the creation method for the composite correction LUT.
Figure 13:
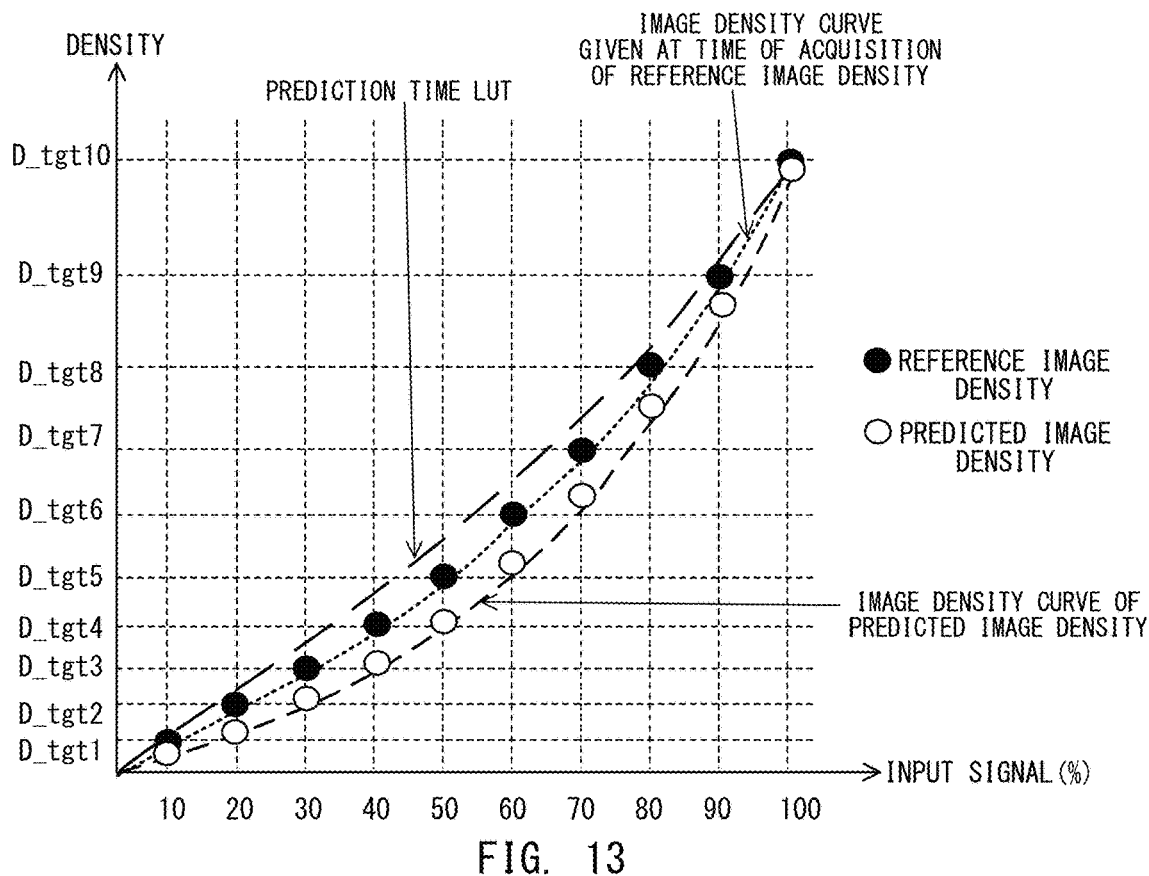
FIG. 13 is an explanatory graph for showing the creation method for the composite correction LUT.
Figure 14:
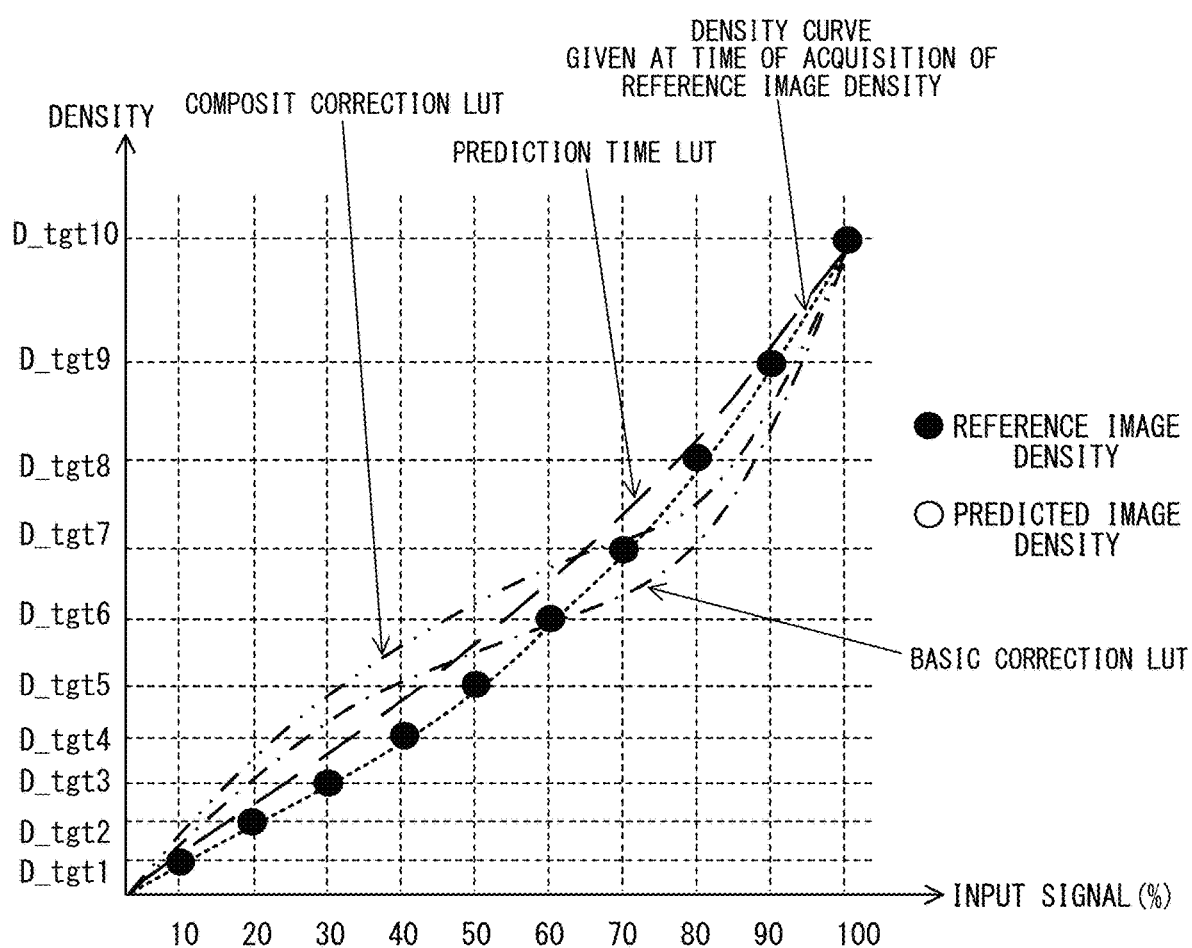
FIG. 14 is an explanatory graph for showing the creation method for the composite correction LUT.

The printer controller 130 acquires predicted image density values described later (Step S301). The printer controller 130 plots the acquired predicted image density values for every tone to create an image density curve (Step S302). FIG. 12 is an explanatory graph for showing the image density curve. The white circles of FIG. 12 are the predicted image density values. The image density curve is indicated by the broken line of FIG. 12. The printer controller 130 performs the reverse conversion for correcting the image density curve to a basic image density curve on the image density curve, to thereby create a prediction time LUT (Step S303). FIG. 13 is an explanatory graph for showing the prediction time LUT. The long broken line of FIG. 13 is the prediction time LUT. The printer controller 130 multiplies the prediction time LUT by the basic correction LUT to create a composite correction LUT (Step S304). FIG. 14 is an explanatory graph for showing the composite correction LUT. The long two-dot chain line of FIG. 14 is the composite correction LUT. The printer controller 130 forms, with the image formation engine unit 101, an image reflecting the composite correction LUT. The creation method for the image density curve may be a generally used approximation method of, for example, using such an approximation formula of connecting ten points.

<Control Timings for Actual Measurement Control and Prediction Control>

An image density correction sequence is actual measurement control of forming a detection image on the intermediate transfer belt 6 and reading the detection image with the image density sensor 120. In general, the image density correction sequence interrupts an image formation sequence being a printing operation. Thus, the image density correction sequence of the actual measurement control is one of factors causing reduction in productivity. Performing the image density correction sequence of the actual measurement control less frequently in consideration of the reduction in productivity may lead to degradation in changes of color tint and image density. In view of such circumstances, in the image forming apparatus 100 in this embodiment, control timings of the image density correction sequence of the actual measurement control are set in consideration of the balance between the changes in color tint and image density and the productivity. It is also possible to form the detection image outside the range used for image formation on the intermediate transfer belt 6 to increase the frequency of the image density correction sequence of the actual measurement control. However, performing the image density correction sequence of the actual measurement control at high frequency may lead to an increase in toner use amount to cause an increase in cost. Thus, it is difficult to perform the image density correction sequence of the actual measurement control at high frequency.

Figure 15A:
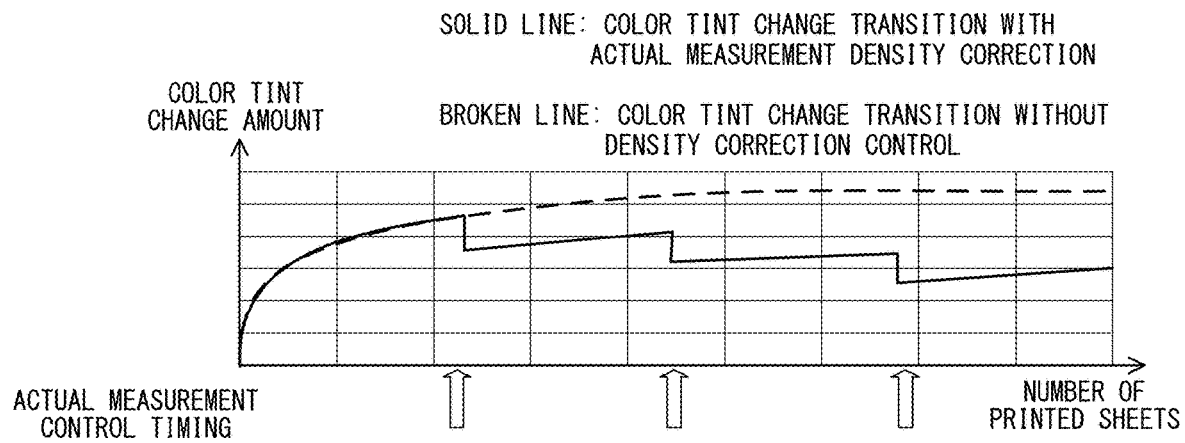
FIG. 15A and FIG. 15B are explanatory graphs for showing control timings of actual measurement control and prediction control.
Figure 15B:
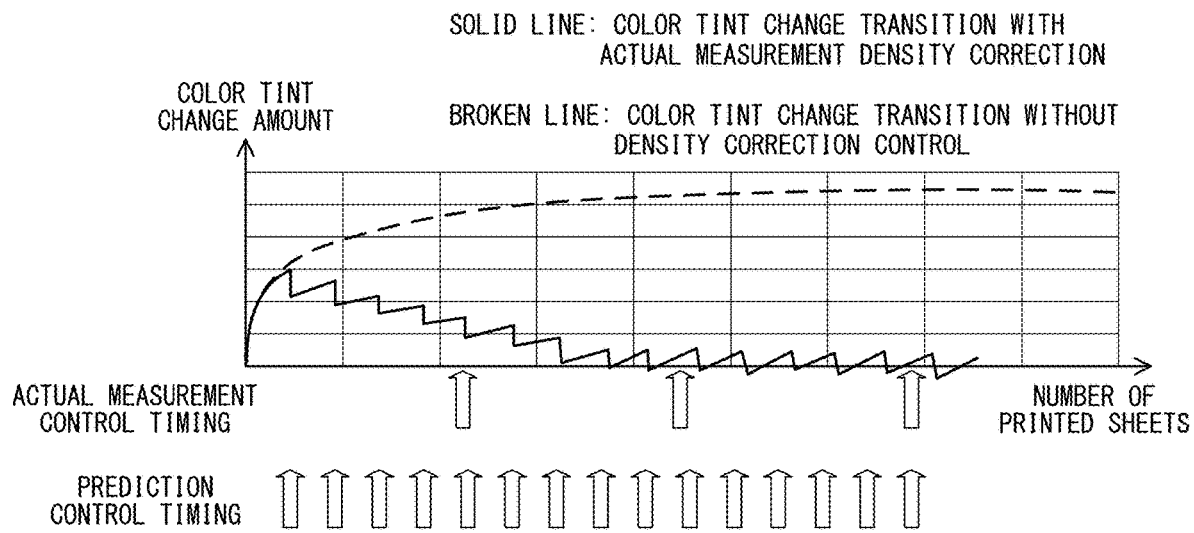

Through the prediction control for the image density, it is possible to correct the image density among controls for the actual measurement control and suppress the changes in color tint and image density. FIG. 15A and FIG. 15B are explanatory graphs for showing control timings of the actual measurement control and the prediction control. FIG. 15A shows the image density correction control timing in the case of only the related-art actual measurement control and the color tint change amount. FIG. 15B shows the image density correction control timings in the case of performing the actual measurement control and the prediction control in this embodiment and the color tint change amount. The image density correction control in this embodiment shown in FIG. 15B can perform the image density correction at higher frequency, and hence the color tint change can be suppressed more than in the related art. Although description is made later, the data set for correction of the image density prediction model is acquired simultaneously at the timing of the control for actually forming the detection image and measuring the image density, including such correction control to be performed with formation of the detection image on the intermediate transfer belt 6.

<Normal Calculation of Image Density>

Figure 16:
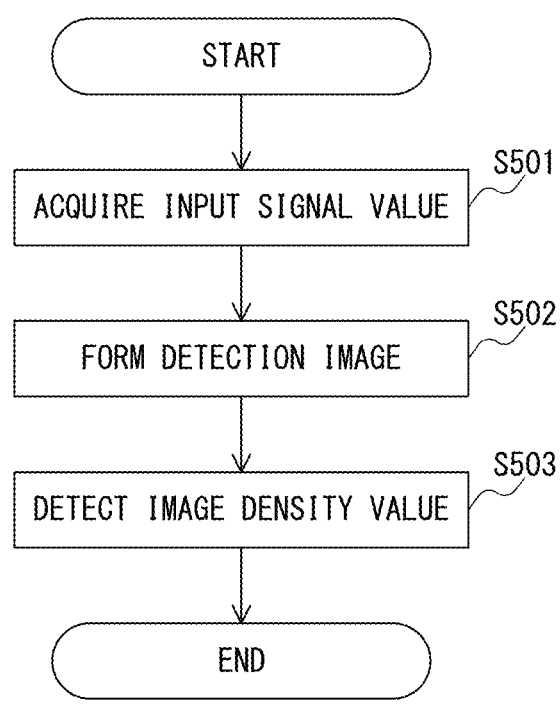
FIG. 16 is a flowchart for illustrating processing for acquiring an image density value.
Figure 17:
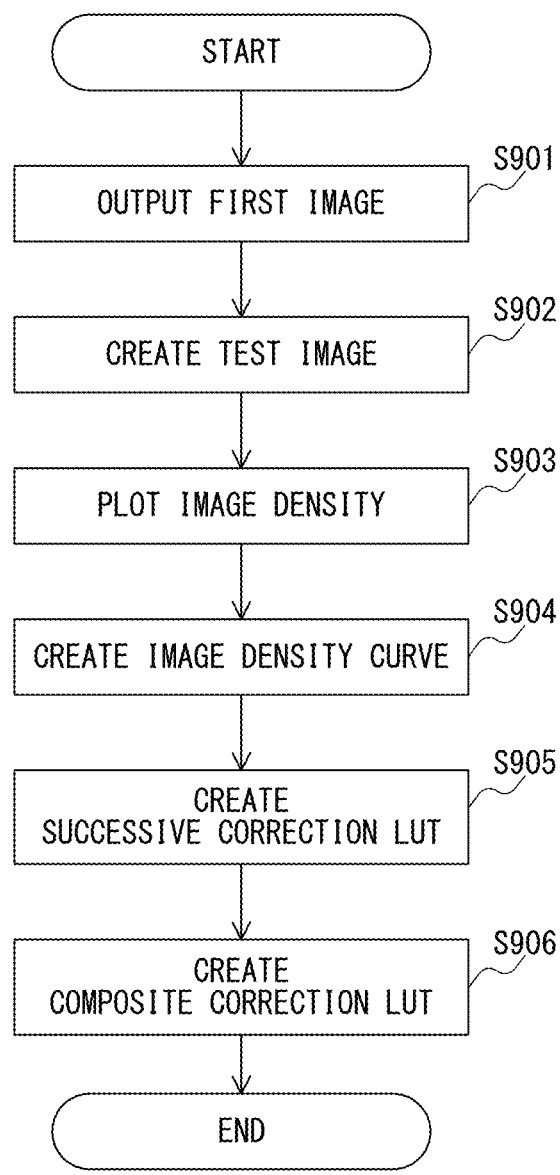
FIG. 17 is an explanatory chart for illustrating a creation method for a composite correction LUT.
Figure 18:
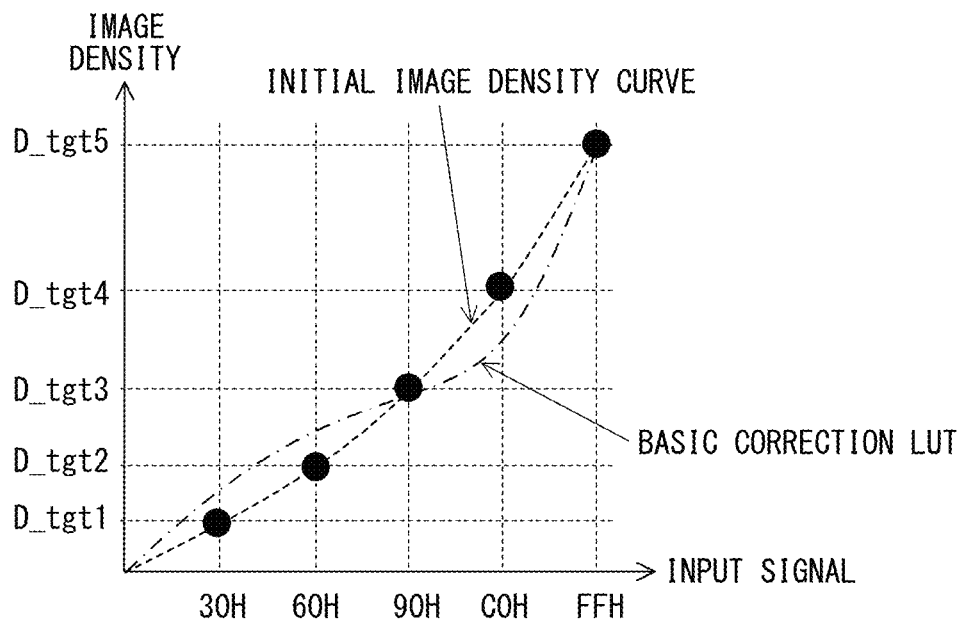
FIG. 18 is an explanatory graph for showing the creation method for the composite correction LUT.
Figure 19:
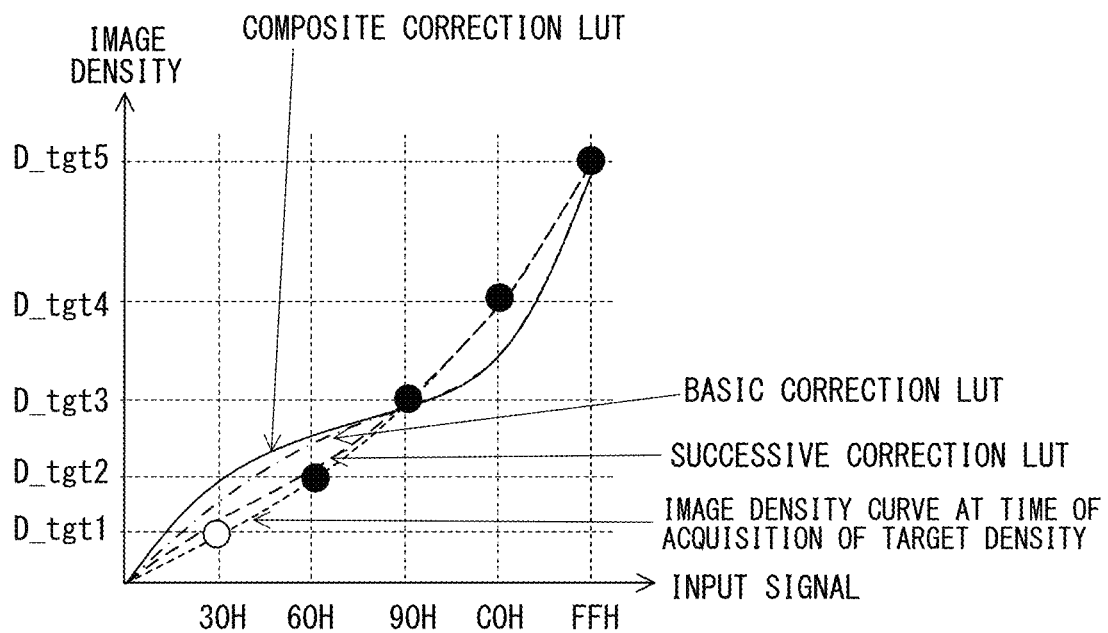
FIG. 19 is an explanatory graph for showing the creation method for the composite correction LUT.
Figure 20:
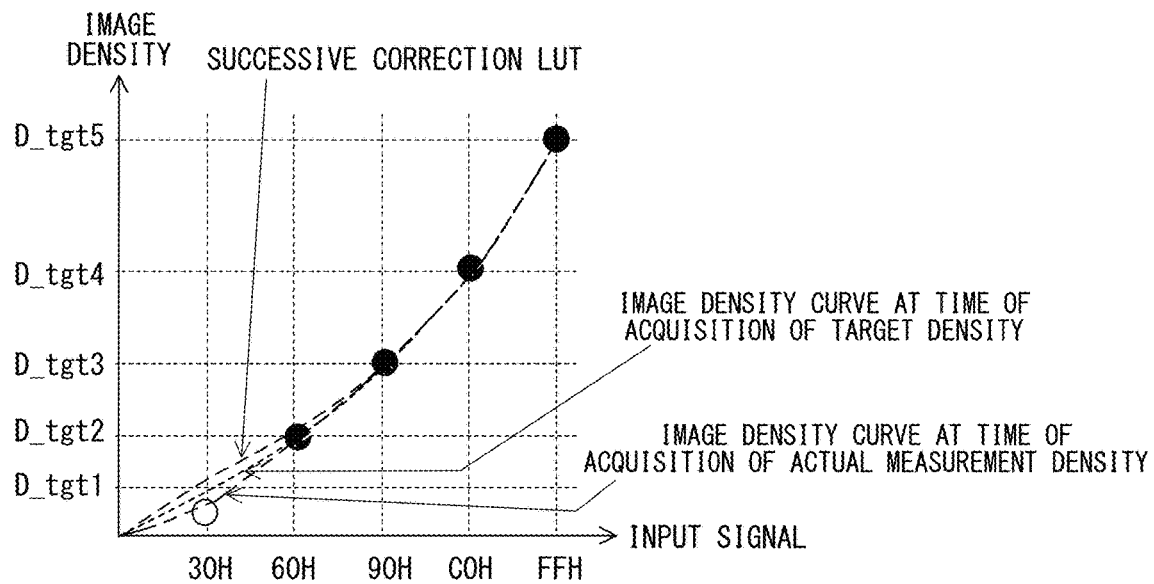
FIG. 20 is an explanatory graph for showing the creation method for the composite correction LUT.

FIG. 16 is a flowchart for illustrating processing of acquiring the current image density value of the image forming apparatus 100 through the image density correction control of the normal actual measurement control of forming the detection image for the image density correction.

The starting conditions of the image density correction control include, for example, turning on the power and termination of the image formation on a predetermined number of sheets. In a case where such starting conditions are satisfied, the printer controller 130 acquires signal values as input signal values and image forming conditions for performing image formation (Step S501). The signal values are pieces of information, such as environment values and leaving time at the time of control operation, the number of toner replenishments, and the like, which can be obtained from the sensor 161, the timer 162, and the counter 163.

The printer controller 130 forms the detection image being a plurality of toner images on the intermediate transfer belt 6 with conditions in accordance with the acquired input signal values (Step S502). In this embodiment, the test images of ten tones for each color are formed as the detection image, but the detection image is not limited to this. The printer controller 130 acquires detection results obtained by the image density sensor 120 for the detection image on the intermediate transfer belt 6. The image density sensor 120 detects the image density values from the detection results of the detection image (Step S503). The image density sensor 120 acquires the image density value (γ characteristic) given at the time of correction in such a manner.

<Creation of LUT at the Time of Actual Measurement Control>

FIG. 17, FIG. 18, FIG. 19, and FIG. 20 are an explanatory chart and explanatory graphs for showing the creation method for the composite correction LUT. In this embodiment, the detection image for the image density correction is used by sequentially forming test images of five tones having image signal values of 30H, 60H, 90H, C0H, and FFH, but is not limited thereto.

The printer controller 130 creates the test images with use of the correction LUT given at the current time point. The printer controller 130 creates, after the automatic tone correction, the test image having a determined tone for image density correction, for example, the test image having an image signal value of 30H through conversion with the basic correction LUT obtained at the time of the automatic tone correction as exemplified in FIG. 18 (Step S901 and Step S902). The printer controller 130 plots the detection result of the created test image obtained by the image density sensor 120 as the detected image density of 30H (Step S903). As indicated by the white circles in FIG. 19, a new detected image density is plotted at the 30H portion of the initial target density value of the initial image density curve.

For other test images having the image density values of 60H, 90H, C0H, and FFH, the image density target values given immediately after the creation of the basic correction LUT are used. The printer controller 130 creates the image density curve indicated by the long two-dot chain line in FIG. 20 with use of five points including the newly plotted 30H actual measurement density value (detected image density) and the initially measured image density values of 60H, 90H, C0H, and FFH (Step S904). This creation method for the image density curve may be a generally used approximation method of, for example, using an approximation formula of connecting five points.

In order to correct the image density curve at the current time point created in Step S904 into the basic image density curve, the printer controller 130 performs reverse conversion on the image density curve given at the current time point to create a successive correction LUT (Step S905). The broken line of FIG. 20 indicates the successive correction LUT. The printer controller 130 creates the composite correction LUT exemplified by the solid line of FIG. 19 obtained by multiplying the successive correction LUT by the basic correction LUT (Step S906). The printer controller 130 forms an image while reflecting the created composite correction LUT. After the composite correction LUT is reflected, the output image and the detection image for image density correction at the next inter-sheet portion are converted with the composite correction LUT and output. After that, the printer controller 130 continuously creates the detection image of another tone and performs density detection to create the image density curve, and newly creates the composite correction LUT from the current composite correction LUT and the successive correction LUT obtained from the image density curve.

<Calculation of Predicted Image Density>

Figure 21:
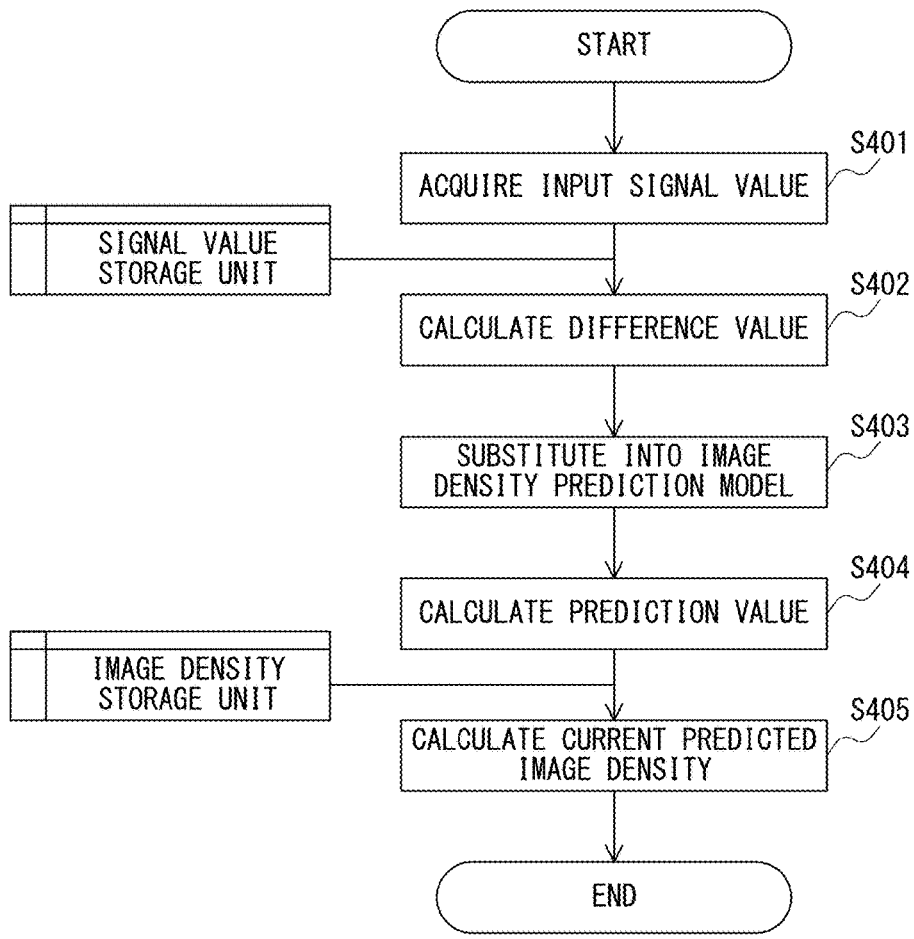
FIG. 21 is a flowchart for illustrating calculation processing for a predicted image density value.

FIG. 21 is a flowchart for illustrating calculation processing for the predicted image density value. This processing is performed in a case where the starting conditions for the predicted image density correction control are satisfied under a state in which the basic signal value and the basic density value are acquired in advance by the above-mentioned method.

In a case where the predicted image density correction control is started, the printer controller 130 acquires signal values as input signal values and the image forming conditions for performing the image formation (Step S401). The signal values are pieces of information such as the environment values given at the time of the control operation and the leaving time, the number of toner replenishments, and the like acquired from the sensor 161, the timer 162, and the counter 163. The printer controller 130 extracts a difference value between the acquired input signal value and the basic signal value stored in advance in the signal value storage unit 401 (Step S402).

The printer controller 130 substitutes the extracted difference value into the image density prediction model expression created in advance (Step S403), and calculates a difference value of the currently given image density with respect to the basic density value as the prediction value of the change amount of the image density (Step S404). The printer controller 130 calculates the currently given predicted image density value from a sum of the calculated prediction value and the basic density value to acquire the γ characteristic (Step S405). Then, the printer controller 130 creates the successive correction LUT for converting the input image signal into an image signal for output with use of the γ characteristic obtained in the processing of Step S405 and a preset tone target. After that, the printer controller 130 multiplies the current composite correction LUT by the above-mentioned successive correction LUT to newly create the composite correction LUT.

<Image Density Prediction Model>

The image density prediction model is obtained by deriving the formula based on experiment results with information correlated with the change in image density as input information and image density information as output information. The input information includes, for example, environment information, time information, count information, and image forming conditions given before leaving the image forming apparatus 100. The environment information is acquired from the sensor 161 immediately after turning on the power of the image forming apparatus 100 or immediately after returning from a sleep state. The time information includes, for example, a leaving time period from a previous printing which can be acquired from the timer 162. The count information includes, for example, the number of toner replenishments and the number of idling turns which can be acquired from the counter 163.

Figure 22:
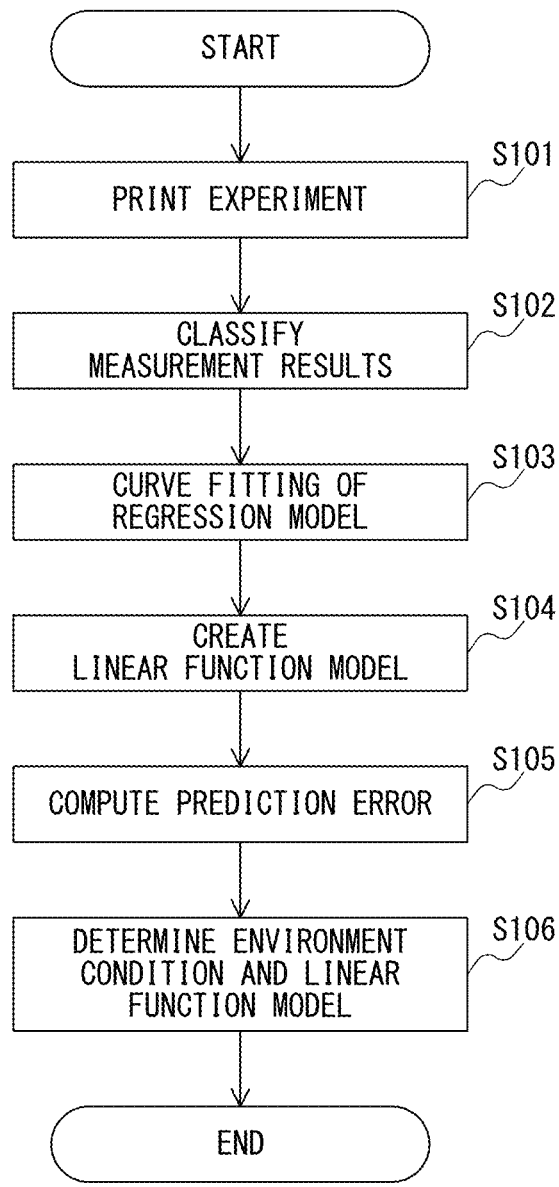
FIG. 22 is a flowchart for illustrating creation processing for an image density prediction model.

FIG. 22 is a flowchart for illustrating creation processing for the image density prediction model. In this embodiment, description is made with use of a multiple regression model. However, without being limited to the multiple regression model, the image density prediction model can be created with use of other regression models.

The printer controller 130 prepares a large number of change patterns of environment conditions and change patterns of image forming conditions, performs print experiments under those conditions, and measures the environment conditions and the image densities (Step S101). The environment conditions include, for example, a toner density and temperature and humidity at various locations inside the developing device 4 at the time of printing, a toner density inside the developing device 4 at the time of previous printing, and a leaving time from the previous printing. Those environment conditions are pieces of environment information obtained immediately after turning on the power. The image forming conditions include, for example, the charging electric potential Vd and the exposure intensity LPW on the photosensitive drum 1, the development contrast Vcont of the developing device 4, and the like. The image density is any one of the density of the detection image on the photosensitive drum 1 or on the intermediate transfer belt 6, or the density on the sheet S.

The printer controller 130 classifies the measured environment conditions and image density into data of the environment change, a change in image forming conditions, and an image density change with the initial data of the experiment date as a reference (Step S102). The printer controller 130 performs curve fitting of the regression model using each environment condition and each image forming condition as input data, the image predicted image density for each tone as output data, and the image actual measurement density for each tone as teaching data (Step S103). The curve fitting of the regression model is performed by determining coefficients of the multiple regression model so as to minimize an error between the image predicted image density and the image actual measurement density based on each piece of data.

In the following, description is made using, as the input signal values, the charging electric potential Vd, the exposure intensity LPW, the toner density inside the developing device 4, and the environment temperature given at the time of printing, but the present disclosure is not limited thereto. Further, description is made of a linear function of four inputs with regard to the input values from the sensor 161, but the regression model can be created by performing similar processing also in the case of using input values of five or more inputs from the sensor 161 and the input of image forming conditions.

The printer controller 130 has four inputs of input variables including, for example, an LPW change $x1(n)$, a charging electric potential change $x2(n)$, a toner density change inside the developing device $x3(n)$, and an environment temperature change $x4(n)$ given at the time of printing. The printer controller 130 creates, as output variables predicted from the combination of the input variables $x_i(n)$, a linear function model of an image density change $y\_(n\_train)$ predicted from the four kinds of input variables (Step S104).

4-input model: $\hat{y}\_(n\_train) = a\_1 \times x\_(n) + a\_2 \times x\_2(n) + a\_3 \times x\_3(n) + a\_4 \times x\_4(n)$ (i=1, 2, 3, 4; n=number of pieces of data)

The printer controller 130 performs curve fitting on the input model (linear function model) using the actually measured actual measurement data of the image density change being output variables as the teaching data $y\_(n\_teach)$. As a method of the curve fitting, for example, a sum of squares L of a prediction error of the prediction values and the actual measurement values as expressed by the following expression is computed on the coefficients (a1, a2, a3, and a4) of the linear function model, and coefficients minimizing the sum are derived.

The deriving method is described. First, the variables are expressed by matrices as follows.

$$y_{n\_teach} = \begin{bmatrix} y_{1\_teach} \\ y_{2\_teach} \\ \vdots \\ y_{n\_teach} \end{bmatrix}, y_{n\_train} = \begin{bmatrix} y_{1\_train} \\ y_{2\_train} \\ \vdots \\ y_{n\_train} \end{bmatrix},$$

$$X = \begin{bmatrix} x_{11} & x_{12} & x_{13} & x_{14} \\ x_{21} & x_{22} & x_{23} & x_{24} \\ & & \vdots & \\ x_{n1} & x_{n2} & x_{n3} & x_{n4} \end{bmatrix}, a = \begin{bmatrix} a_1 \\ a_2 \\ a_3 \\ a_4 \end{bmatrix}$$

Then, the printer controller 130 calculates a sum of squares L of the prediction values and the actual measurement values. In this manner, the prediction error is computed (Step S105).

$$\sum_{n=1}^{n}(y_{n\_teach} - y_{ntrain})^2 =$$

$$(y_{n\_teach} \sim y_{n\_train})^T (y_{n\_teach} \sim y_{n\_train}) = y^T y - 2y^T X a + a^T X^T X a$$

An expansion thereof is the sum of squares L of the prediction error. The purpose is to obtain a matrix "a" which achieves the minimum sum of squares L, that is, coefficients (a1, a2, a3, and a4) of the linear function model which achieve the minimum sum of squares L.

$L = y^T y - 2y^T X a + a^T X^T X a$

Thus, the printer controller 130 sets the sum of squares L as a dependent variable and sets an expression obtained by differentiating the sum of squares L with "a" to 0, and solves the expression to derive optimum coefficients for the regression model (Step S106).

First, the printer controller 130 obtains the following expression by differentiating the expression given above.

$$\frac{\partial}{\partial a}L = \frac{\partial}{\partial a}\left(y^T y - 2y^T X a + a^T X^T X a\right) = -2y^T X + a^T\left(X^T X + (X^T X)^T\right)$$

The printer controller 130 sets a solution thereto as 0, and expands the expression with the "a" placed on the left to derive the "a" as follows.

$-2y^T X + a^T (X^T X + (X^T X)^T) = 0$ $a = ((X^T X)^T X^T y_{n\_teach})$

In such a manner, the multiple regression model is created by obtaining a matrix of the coefficients "a" of the multiple regression model as one example of the image density prediction model. In this embodiment, simple input variables such as x1(n), x2(n), x3(n), and x4(n) are given. In a case where the input variables are set to the product or the quotient of the environment condition and the image forming condition, such as x1(n)×x2(n), a complicated model can also be considered. For example, input variables which can express a change in toner charging amount in consideration of the toner density and the leaving time inside the developing device 4 may be created, and the prediction model can be considered.

<Correction of Image Density Prediction Model>

Figure 23:
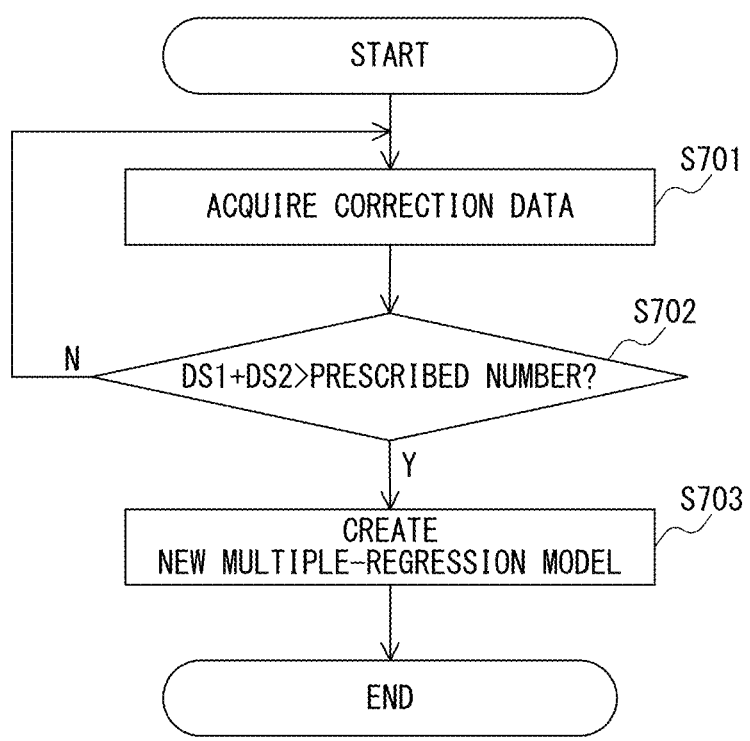
FIG. 23 is a flowchart for illustrating processing for correcting the image density prediction model.

FIG. 23 is a flowchart for illustrating processing of correcting the image density prediction model. As described above, in a case where the calibration control for image density adjustment is performed with use of the optimum image density prediction model individually corresponding to the use environment, the output condition, and the use situation, it is required that the image density prediction model to be used be corrected. This is because, typically, an average model that can cover the use environment or situation to some extent is generally used for the image density prediction model that is set at the time of shipment, and such model is not necessarily optimum for the individual use environment.

In order to correct the image density prediction model, data including a combination of an actual change in image density and the environment and output conditions or the like is required. In this embodiment, the printer controller 130 acquires data for correction of the image density prediction model simultaneously with the control of forming the detection image for the calibration and adjusting the image density (Step S701). That is, the printer controller 130 executes the image density correction control with use of the image density sensor 120 (first image density sensor) for detecting the image density of the detection image formed on the intermediate transfer belt 6. At this timing, the printer controller 130 acquires a set of the image density value, the sensor value, the timer value, the counter value, and the image forming conditions and stores the set thereof as data DS1 for correction of the image density prediction model. Further, the printer controller 130 detects the image density of the detection image formed on the sheet S with use of the reader A (second image density sensor) and executes the image density correction control based on the detection result (measurement result). At this timing, which is the timing of the above-mentioned automatic tone correction that is periodically performed, the printer controller 130 acquires a set of the image density value, the sensor value, the timer value, the counter value, and the image forming conditions and stores the set thereof as data DS2 for correction of the image density prediction model. The printer controller 130 increases the number "n" of data pieces for each of the data DS1 and DS2 for correction of the image density prediction model and adds the data pieces to the following matrix data.

$$y_{n\_teach} = \begin{bmatrix} y_{1\_teach} \\ y_{2\_teach} \\ \vdots \\ y_{n\_teach} \end{bmatrix}, y_{n\_train} = \begin{bmatrix} y_{1\_train} \\ y_{2\_train} \\ \vdots \\ y_{n\_train} \end{bmatrix},$$

$$X = \begin{bmatrix} x_{11} & x_{12} & x_{13} & x_{14} \\ x_{21} & x_{22} & x_{23} & x_{24} \\ & & \vdots & \\ x_{n1} & x_{n2} & x_{n3} & x_{n4} \end{bmatrix}, a = \begin{bmatrix} a_1 \\ a_2 \\ a_3 \\ a_4 \end{bmatrix}$$

The printer controller 130 additionally acquires the data DS1 and DS2 for correction of the image density prediction model until the number "n" of data pieces reaches a prescribed number (Step S702: N). In a case where the number "n" of data pieces reaches the prescribed number (Step S702: Y), the printer controller 130 calculates again the coefficients "a" of the multiple regression model by a method similar to that of the above-mentioned processing with use of the added and updated variables to create a new multiple regression model (Step S703). The new multiple regression model is used as the corrected image density prediction model.

To perform the correction of the image density prediction model, correction of the model actually being subjected to the image density prediction control may be advanced as required, or with a plurality of image density prediction models being provided, the model for actually performing the image density prediction and the image density prediction model for advancing the correction may be separately provided. Further, accumulation of data for correcting the image density prediction model and execution of computation for determining the actually corrected image density prediction model are achievable by performing those in the image forming apparatus 100 or in a device connected via network to the image forming apparatus 100.

<Processing of Information Processing Apparatus>

Figure 24:
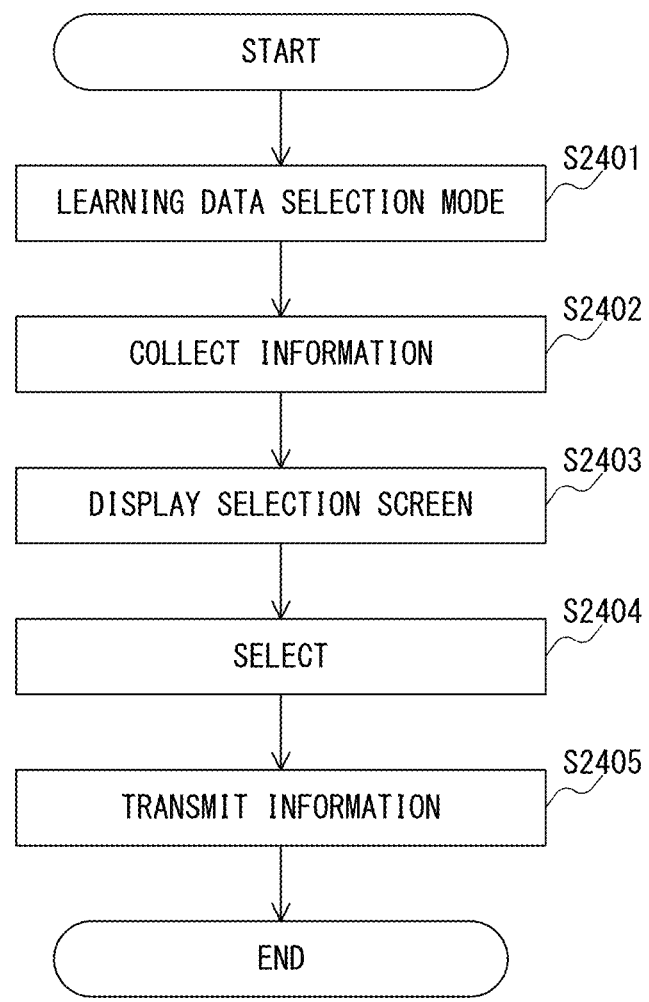
FIG. 24 is a flowchart for illustrating processing performed by an information processing apparatus.

FIG. 24 is a flowchart for illustrating processing performed by the information processing apparatus 200 of this embodiment. The information processing apparatus 200 has an application or a driver installed in advance for performing operation on the image forming apparatus 100.

A user operates the image forming apparatus 100 at a predetermined timing to execute an application for performing operation on the image forming apparatus 100, and selects a learning data selection mode. As a result, the information processing apparatus 200 starts operation by the learning data selection mode (Step S2401). In a case where the operation by the learning data selection mode is started, the information processing apparatus 200 uses the collection unit 201 to collect date/time information and print condition information of each data set of the image density prediction model update data set stored in the condition storage unit 403 of the storage apparatus 400 (Step S2402).

The information processing apparatus 200 displays, with the display unit 202, the collected information on the liquid crystal panel 205 (see FIG. 5) as a learning data selection mode screen 206 (Step S2403). A user selects, from the image density prediction model update data set (log data) of the learning data displayed on the learning data list 207, the data that is not used for the image density prediction model on the non-use check box 208. In a case where the user makes selection on the non-use check box 208 and thereafter presses the enter button 209, the information processing apparatus 200 receives the selected contents with the receiver 203. As a result, the image density prediction model update data set selected by the user is determined (Step S2404). The information processing apparatus 200 transmits, with the transmitter 204, information of the image density prediction model update data set which is not selected on the non-use check box 208 to the computing apparatus 300 (Step S2405). The processing of the information processing apparatus 200 is then terminated.

The computing apparatus 300 refers, with the selection unit 301, the information of the image density prediction model update data set acquired from the information processing apparatus 200 and the condition storage unit 403 to select the data set for updating the image density prediction model and update the image density prediction model. Details of processing for creating and updating the image density prediction model are as described above.

In a case where the learning data selection mode is not selected, as described above with reference to FIG. 23, the image density prediction model is updated successively at the time point at which the number "n" of data pieces of the data DS1 and DS2 for correction of the image density prediction model reaches the prescribed number. The image density prediction model update data set used for creating the correction model may be a data set newly collected from the previous update or all the image density prediction model update data sets stored in the signal value storage unit 401 and the image density storage unit 402.

The image density prediction model update data set that has once been selected as being "not used" in the learning data selection mode is not used also in the subsequent updates of the image density prediction model. For example, with the non-use check box 208 being kept in a state of automatically being selected, user's operation of selecting the same data into "not used" every time can be omitted.

Further, it is not always required that, after the information processing apparatus 200 transmits the information of the image density prediction model update data set to the computing apparatus 300, the computing apparatus 300 immediately update the image density prediction model. For example, the computing apparatus 300 may reflect the information transmitted by the information processing apparatus 200 at the timing of the next successive update for the image density prediction model.

In the manner described above, with the user suitably selecting the image density prediction model update data set in the learning data selection mode, the user can update the image density prediction model with use of any suitable data.

<Effect of Selecting Image Density Prediction Model Update Data Set>

For example, it is assumed that the change in color tint of the image printed on the sheet S at a predetermined timing becomes larger and the user feels that the accuracy of the image density prediction model is lowered. Here, the learning data selection mode is presented to the information processing apparatus 200 so that the user can check the print condition information given at the time of updating the image density prediction model. When there is any condition that has significantly changed, the image density prediction model given at that time seems to use the data which diverges from the data having been used for updating the image density prediction model so far.

For example, in a case where the image forming apparatus 100 is temporarily installed in another environment having different temperature and humidity, or in a case where a print job having a toner consumption amount different from a usual toner consumption is executed, the print condition information significantly changes. Further, there is also a possibility that print condition information which has not been expected is set due to occurrence of an error. The user can refer to such print condition information to exclude, from the image density prediction model, a predetermined data set which is not suitable for updating the image density prediction model. Further, even when the user incorrectly registers the setting of the print condition information (for example, paper type information) and the print job is executed, it is possible to exclude the setting from the updating of the image density prediction model. In this manner, through selection of the learning data set which is not suitable for updating the image density prediction model, the correction accuracy of the image density prediction model can be kept at high accuracy.

As described above, the user selects data required for image density prediction model for the image forming apparatus 100. Thus, it is possible to remove such learning data that may lower the correction accuracy, thereby being capable of keeping the correction accuracy of the image density prediction model at high accuracy.

Modification Example

In FIG. 1, description has been made of the configuration in which the image density prediction control system 1000 includes the image forming apparatus 100, the information processing apparatus 200, the computing apparatus 300, and the storage apparatus 400. Among those, the information processing apparatus 200, the computing apparatus 300, and the storage apparatus 400 may be integrated with the image forming apparatus 100. For example, the operation unit 20 and the display unit 110 of the image forming apparatus 100 correspond to the information processing apparatus 200, and the storage (not shown) of the image forming apparatus 100 corresponds to the computing apparatus 300 and the storage apparatus 400. With such configuration, the processing of the image density prediction control system 1000 can be achieved with only the image forming apparatus 100.

In the description above, as examples of the print condition information, there are given the toner consumption amount information of image data, toner amount information inside the image forming unit P of the image forming apparatus 100, the paper type information given at the time of executing the print job, and a history of errors that have occurred during the print job. The learning data selection mode screen 206 may display not only one of the pieces of print condition information but also a plurality of pieces of print condition information out of the pieces of print condition information.

FIG. 25 is an exemplary view for illustrating a case in which a plurality of pieces of print condition information are displayed. In FIG. 25, the date/time information, the temperature/humidity information, the paper type information, and the error count information are displayed as the print condition information. The pieces of print condition information are displayed in the order of dates from the most recent date. Further, in the learning data list 207, the condition (number 2) that has caused an error is displayed with emphasis. With such display, the user can more easily select the image density prediction update data set.

Further, in the description above, the user selects, from the plurality of image density prediction model update data sets (log data) displayed on the learning data list 207, the image density prediction model update data set that is not used for prediction of the image density. However, the user may select, from the plurality of image density prediction model update data sets (log data), the image density prediction model update data set to be used for prediction of the image density. In this configuration, the transmitter 204 transmits user instruction information relating to a selection result of data set to be used for updating (generating) the image density prediction model as the selected information to the computing apparatus 300. As another example, in this configuration, the model updating unit 304 generates the image density prediction model based on the data set used for updating (generating) the image density prediction model.

Further, in the above, description has been made of the configuration in which the model updating unit 304 generates a function model. However, the model is not limited to the function model, and may be a table showing a correspondence between the signal values output from the sensor 161, the timer 162, and the counter 163 and the predicted density.

Further, the description has been made assuming that the model uses all the signal values output from the sensor 161, the timer 162, and the counter 163. However, there may be provided a model which predicts a predicted density based on an output signal value from at least one of the sensor 161, the timer 162, or the counter 163.

Further, in the image density prediction control system 1000 described above, the information processing apparatus 200 and the computing apparatus 300 are provided as separate apparatus. However, the computing apparatus 300 may be included in the information processing apparatus 200. It is only required that the multiple regression model of the image forming apparatus 100 be updated by allowing the transmitter 204 of the information processing apparatus 200 to transmit a new multiple regression model to the printer controller 130.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-136939, filed Aug. 25, 2021, which is hereby incorporated by reference herein in its entirety.

What is claimed is:

1. An information processing apparatus configured to communicate with a separate computing apparatus and with a storage unit, wherein the separate computing apparatus generates a model for controlling an image density of an image to be formed by an image forming apparatus, and wherein the storage apparatus stores log data associated with (i) density data related to an image density of a test image formed by the image forming apparatus, (ii) a timing at which the image density of the test image formed by the image forming apparatus was detected, and (iii) log data related to a state of the image forming apparatus at a timing at which the image density of the test image was detected, the information processing apparatus comprising:
a display configured to display a group of sets of data, wherein the sets of data are associated with (i) the timing at which the image density of the test image was detected and (ii) the state of the image forming apparatus at the timing at which the image density of the test image was detected; and
an information processor configured to:
receive a result of manual selection of one or more sets of data from the group of sets of data; and
transmit selection information indicating the result of the manual selection to the separate computing apparatus,
wherein the separate computing apparatus generates the model based on the log data stored in the storage apparatus and the selection information.

2. The information processing apparatus according to claim 1,
wherein the state of the image forming apparatus includes environment information detected by a sensor provided in the image forming apparatus.

3. The information processing apparatus according to claim 1,
wherein the state of the image forming apparatus includes information about occurrence of an error of the image forming apparatus.

4. The information processing apparatus according to claim 1,
wherein the plurality of timings displayed on the display is sorted in time order.

* * * * *